US012677280B2

(12) United States Patent
Kang et al.

(10) Patent No.: US 12,677,280 B2
(45) Date of Patent: Jul. 7, 2026

(54) DEVICE, METHOD, AND COMPUTER-READABLE STORAGE MEDIUM FOR TRANSMITTING AND RECEIVING INFORMATION FOR PERFORMING COMMUNICATION IN UNLICENSED BAND

(71) Applicant: THINKWARE CORPORATION, Seongnam-si (KR)

(72) Inventors: Jeoungkyu Kang, Seongnam-si (KR); Daewon Kim, Seongnam-si (KR); Taekyu Han, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 635 days.

(21) Appl. No.: 17/894,494

(22) Filed: Aug. 24, 2022

(65) Prior Publication Data

US 2023/0070908 A1 Mar. 9, 2023

(30) Foreign Application Priority Data

Aug. 25, 2021 (KR) .......................... 10-2021-0112689

(51) Int. Cl.
*H04W 72/20* (2023.01)
*H04W 92/18* (2009.01)

(52) U.S. Cl.
CPC ............ *H04W 72/20* (2023.01); *H04W 92/18* (2013.01)

(58) Field of Classification Search
None
See application file for complete search history.

(56) References Cited

U.S. PATENT DOCUMENTS 11,558,141 B2 1/2023 Hahn et al.
11,943,746 B2 3/2024 Lee et al.
(Continued)

FOREIGN PATENT DOCUMENTS

CN 112399624 A 2/2021
KR 20210023712 A 3/2021
(Continued)

OTHER PUBLICATIONS

Extended European Search Report dated Jan. 10, 2023, issued in counterpart EP Application No. 22192000.2. (181 pages).
(Continued)

*Primary Examiner* — Diane L Lo
(74) *Attorney, Agent, or Firm* — WHDA, LLP

(57) ABSTRACT

According to various embodiments, a first user equipment (UE) include a transceiver to transmit and receive a wireless signal; and a processor connected to the transceiver, wherein the processor is configured to receive first side link control information (SCI) from a second UE through a physical side link control channel (PSCCH) configured in unlicensed band, receive a second SCI from the second UE through a physical side link shared channel (PSSCH) determined based on the PSCCH, wherein the first SCI and the second SCI are configured in different formats, based on at least one of the first SCI and the second SCI, identify information for performing side link communication with the second UE in the unlicensed band, and receive, based on the identified information, data from the second UE through a side link communication path between the first UE and the second UE.

20 Claims, 15 Drawing Sheets

(56) References Cited

U.S. PATENT DOCUMENTS

| | | | | |
|---|---|---|---|---|
| 2020/0154471 A1* | 5/2020 | Sun | ..................... | H04W 74/006 |
| 2020/0351669 A1* | 11/2020 | Xu | ......................... | H04W 76/14 |
| 2022/0039161 A1* | 2/2022 | Zhang | ................... | H04W 72/20 |
| 2022/0116929 A1* | 4/2022 | Wang | .................... | H04W 72/20 |
| 2022/0240227 A1* | 7/2022 | Lee | ..................... | H04L 1/1825 |
| 2022/0256539 A1* | 8/2022 | Xue | ..................... | H04W 72/02 |
| 2023/0055280 A1 | 2/2023 | Hwang et al. | | |
| 2023/0073111 A1* | 3/2023 | Hwang | ................ | H04L 51/066 |
| 2023/0328784 A1* | 10/2023 | Lei | ...................... | H04W 72/25 |
| | | | | 370/329 |

FOREIGN PATENT DOCUMENTS

| | | | |
|---|---|---|---|
| WO | 2021071331 A1 | 4/2021 | |
| WO | 2021145745 A1 | 7/2021 | |

OTHER PUBLICATIONS

Office Action dated Aug. 1, 2025, issued in counterpart EP Application No. 22192000.2 (10 pages).

Office Action dated Jun. 26, 2025, issued in counterpart CN Application No. 202211024116.X with English translation (21 pages).

* cited by examiner

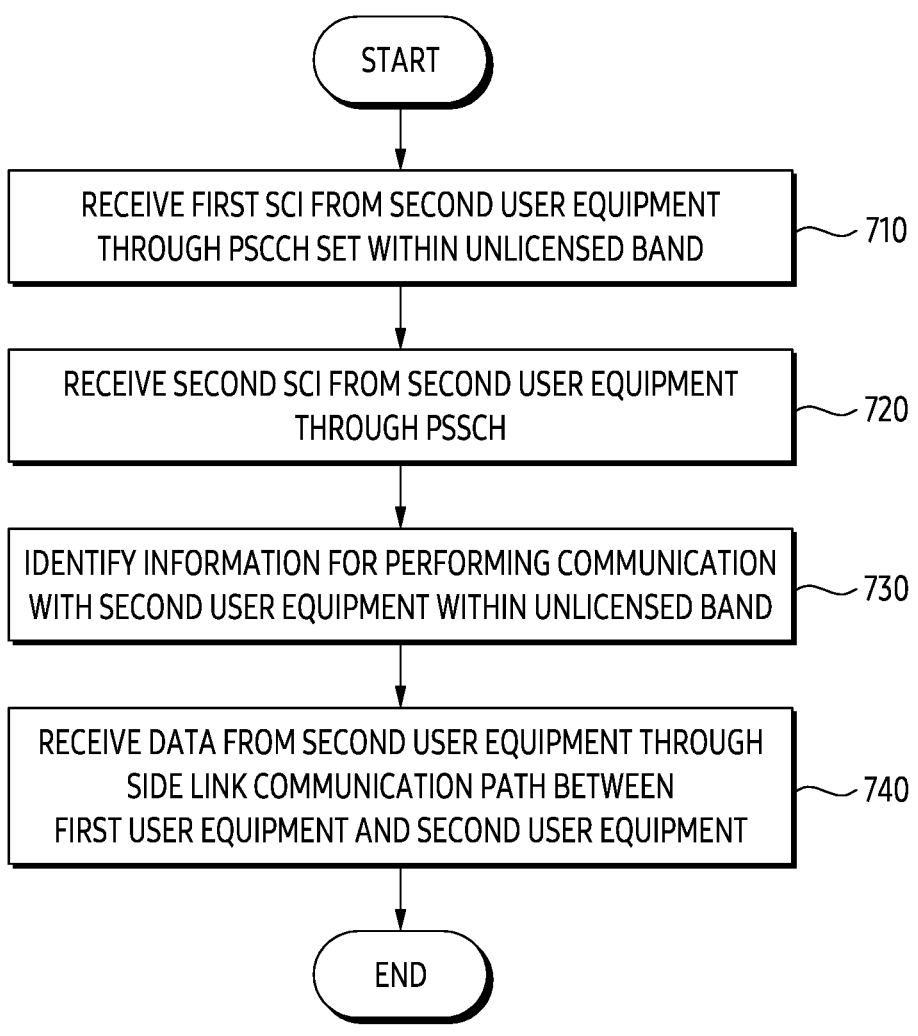

START

RECEIVE FIRST SCI FROM SECOND USER EQUIPMENT
THROUGH PSCCH SET WITHIN UNLICENSED BAND     710

RECEIVE SECOND SCI FROM SECOND USER EQUIPMENT
THROUGH PSSCH     720

IDENTIFY INFORMATION FOR PERFORMING COMMUNICATION
WITH SECOND USER EQUIPMENT WITHIN UNLICENSED BAND     730

RECEIVE DATA FROM SECOND USER EQUIPMENT THROUGH
SIDE LINK COMMUNICATION PATH BETWEEN
FIRST USER EQUIPMENT AND SECOND USER EQUIPMENT     740

END

DEVICE, METHOD, AND COMPUTER-READABLE STORAGE MEDIUM FOR TRANSMITTING AND RECEIVING INFORMATION FOR PERFORMING COMMUNICATION IN UNLICENSED BAND

CROSS-REFERENCE TO RELATED APPLICATIONS

This application is based on and claims priority under 35 U.S.C. § 119 to Korean Patent Application No. 10-2021-0112689, filed on Aug. 25, 2021, in the Korean Intellectual Property Office, the disclosure of which is incorporated by reference herein in its entirety.

BACKGROUND

Technical Field

The following descriptions relate to devices, methods, and computer-readable storage medium for transmitting and receiving information for performing communication in an unlicensed band.

Description of Related Art

After the first generation mobile communication, in which only voice signals are transmitted and received in the past, mobile communication has evolved to the present fifth generation (hereinafter referred to as 5G) mobile communication. The 5G mobile communication technology has been developed with the goal of enhanced mobile broadband (eMBB), ultra-reliable & low latency communication (URLLC), and machine-type communications (mMTC).

Currently, development for system network improvement is in progress based on advanced small cell, cloud radio access network (RAN), ultra-dense network, device-to-device (D2D) communication, wireless backhaul, mobile network, cooperative communication, coordinated multi-point (CoMP) transmission and reception, interference mitigation and cancellation, and the like.

5G mobile communication technology is a new radio access technology (RAT) and is referred to NR (new radio). NR may support various communication types. NR may support vehicle to everything (V2X) communication (i.e., C (Cellular)-V2X communication). V2X communication refers to communication between vehicles and objects. V2X communication may include both wired communication and wireless communication, and various information may be exchanged through V2X communication. Cellular communication-based V2X communication may be referred to as C-V2X. In particular, NR-based V2X communication may be referred to as NR-V2X.

SUMMARY

For C (Cellular)-V2X communication, discussion for the integrity (or URLLC) of the communication connection is currently in progress, but the procedure for securing the amount of transmitted data (or the amount of received data) is not defined. Accordingly, a method for securing the amount of data may be required.

The spectrum for C-V2X communication (i.e., licensed band) and unlicensed band are set separately, and most of the signal exchange during C-V2X communication take place in the licensed band, but an error in communication and a sharp drop in reliability may occur due to an external obstacle or the like. C-V2X communication is basically communication between a vehicle and an object, and reliability and low latency of a signal may be essentially required.

Therefore, in this case, the need to use an unlicensed band in C-V2X communication may be required. Although downlink control information (DCI) format in the unlicensed band is set, a side link control information (SCI) format is not set. Accordingly, additional information for using the unlicensed band in the SCI format to perform C-V2X communication in the unlicensed band may be further required.

The technical problems to be achieved in this document are not limited to those described above, and other technical problems not mentioned herein will be clearly understood by those having ordinary knowledge in the art to which the present disclosure belongs, from the following description.

According to various embodiments, a first user equipment (UE) may comprise a transceiver to transmit and receive a wireless signal; and a processor connected to the transceiver, wherein the processor may be configured to receive first side link control information (SCI) from a second UE through a physical side link control channel (PSCCH) configured in unlicensed band, receive a second SCI from the second UE through a physical side link shared channel (PSSCH) determined based on the PSCCH, wherein the first SCI and the second SCI are configured in different formats, based on at least one of the first SCI and the second SCI, identify information for performing side link communication with the second UE in the unlicensed band, and receive, based on the identified information, data from the second UE through a side link communication path between the first UE and the second UE.

According to various embodiments, a second user equipment (UE) may comprise a transceiver to transmit and receive a wireless signal; and a processor connected to the transceiver, wherein the processor may be configured to transmit first side link control information (SCI) to the first UE through a physical side link control channel (PSCCH) configured in unlicensed band, transmit a second SCI to the first UE through a physical side link shared channel (PSSCH) determined based on the PSCCH, wherein the first SCI and the second SCI are configured in different formats, and based on at least one of the first SCI and the second SCI, transmit data to the first UE through a side link communication path between the first UE and the second UE.

According to various embodiments, a computer readable storage medium storing one or more programs, the one or more programs may comprise instructions which cause the first electronic device to receive first side link control information (SCI) from a second UE through a physical side link control channel (PSCCH) configured in unlicensed band, receive a second SCI from the second UE through a physical side link shared channel (PSSCH) determined based on the PSCCH, wherein the first SCI and the second SCI are configured in different formats, based on at least one of the first SCI and the second SCI, identify information for performing side link communication with the second UE in the unlicensed band, and receive, based on the identified information, data from the second UE through a side link communication path between the first UE and the second UE.

The effects that can be obtained from the present disclosure are not limited to those described above, and any other effects not mentioned herein will be clearly understood by those having ordinary knowledge in the art to which the present disclosure belongs, from the following description.

BRIEF DESCRIPTION OF THE DRAWINGS

FIG. 7 illustrates an example of an operation of a first user equipment according to various embodiments.

DETAILED DESCRIPTION

Figure 1:
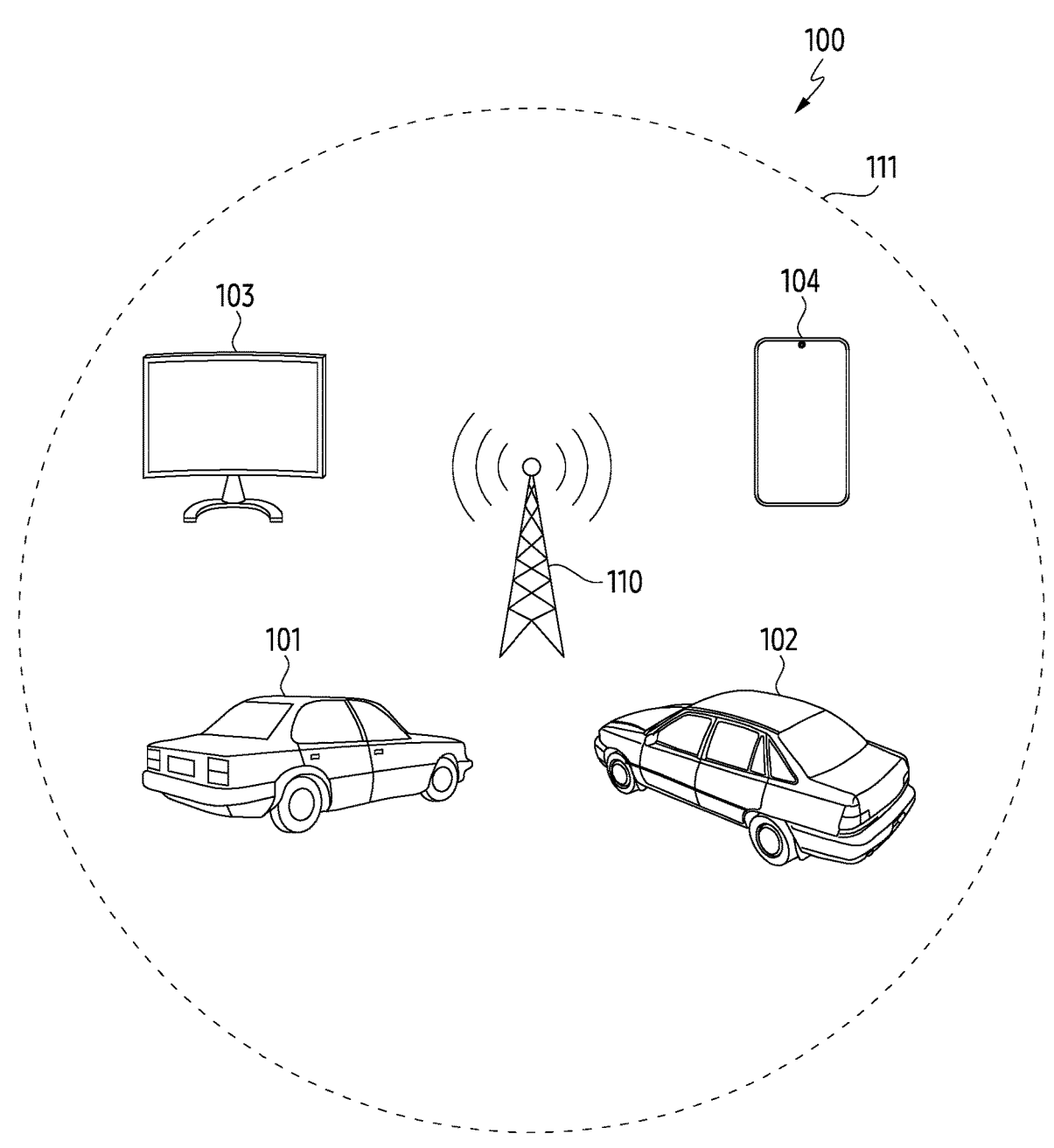
FIG. 1 illustrates a basic conceptual diagram of mobile communication.

According to various embodiments, an unlicensed band can be used for side link communication. Specifically, when a communication error occurs due to an external obstacle or the like, or reliability decreases rapidly while performing side link communication through a licensed band, the unlicensed band can be used. Conversely, when reliability decreases rapidly while performing side link communication through the unlicensed band, the licensed band can be used.

According to various embodiments, information for performing side link communication in the unlicensed band can be newly defined and added.

According to an embodiment, the user equipment can identify information on channel access in the unlicensed band through the exchange of the newly defined information.

According to an embodiment, the user equipment can identify information for feedback request in an unlicensed band through the exchange of the newly defined information.

According to an embodiment, the user equipment can identify information on channel occupancy in the unlicensed band through the exchange of the newly defined information.

According to the above-described embodiments, wireless signal transmission and reception can be efficiently performed in a wireless communication system.

Hereinafter, various embodiments of the present document will be described with reference to the accompanying drawings.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include anyone of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or portion thereof, adapted to perform one or more functions. For example, according to an embodiment, the module may be implemented in a form of an application-specific integrated circuit (ASIC).

FIG. 1 illustrates a basic conceptual diagram of mobile communication.

Referring to FIG. 1, a mobile communication system 100 may include a network for performing communication by an electronic device. The network may be configured in various ways. For example, the network may be configured as NR, long term evolution (LTE), LTE-advanced (LTE-A), or wireless LAN (e.g., Wi-Fi 802.11a/b/g/n/a/ax/be).

The electronic device may include vehicles 101 and 102, a TV 103, and a smartphone 104. The electronic device (e.g., the vehicle 101, the vehicle 102, the TV 103, and the smartphone 104) illustrated in FIG. 1 are exemplary, and the electronic device may include various devices. For example, the electronic device may include a home appliance, a server, an Internet of Thing (IOT) device, a computer, a laptop, and the like.

The electronic device may be variously referred to according to the type of the network. The electronic device may be referred to as user equipment (hereinafter, UE), a mobile station, a subscriber station, a wireless terminal (or device), or the like.

The electronic device may be connected to the base station 110. The base station 110 may include various devices or nodes for wireless communication. For example, the base station 110 may include a transmit point (TP), transmit-receive point (TRP), enhanced base station (or eNB), a 5G base station (gNB), an access point (AP), and the like.

A coverage 111 may indicate a limit area in which a signal may be transmitted and received through the base station 110. The coverage 111 illustrated in FIG. 1 is illustrated in a circular shape, but is not limited thereto. The coverage 111 may be configured in various forms according to various situations. In addition, the coverage 111 does not mean only a two-dimensional area, but may be configured to a three-dimensional space (e.g., a hemisphere or a sphere).

The electronic device may transmit and receive a control message and user data through legacy communication and/or 5G communication. For example, the control message may include a message related to at least one of security control, bearer setup, authentication, registration, or mobility management of the electronic device. For example, the user data may mean user data excluding a control message transmitted and received between an electronic device and a core network (e.g., an Evolved Packet Core (EPC)).

The electronic device may perform communication through the base station 110, and the electronic devices may be directly connected to each other without passing through the base station.

For example, the vehicle 101 and the vehicle 102 may be directly connected to each other without passing through the base station 110. As an example, the vehicle 101 and the vehicle 102 may transmit and receive data through side link communication.

As another example, the TV 103 and the smartphone 104 may transmit and receive data to and from each other through various wireless communication (e.g., Bluetooth or Wi-Fi) without passing through the base station 110.

The mobile communication system 100 of FIG. 1 illustrates an example configured with one base station 110, but is not limited thereto. The mobile communication system 100 may include a plurality of base stations including the base station 110. Each of the plurality of base stations may be connected to a plurality of electronic devices, and electronic devices connected to different base stations may communicate with each other.

According to an embodiment, the first electronic device connected to the first base station among a plurality of base stations may be out of the coverage of the first base station. The first electronic device may go out of the coverage of the first base station and enter the coverage of the second base station among the plurality of base stations. The first electronic device may perform a handover procedure for releasing a connection with a first base station and establishing a connection with a second base station. After the handover procedure is completed, the first electronic device may perform communication through the second base station.

Hereinafter, for convenience of description, the base station may be described as a base station (BS). In addition, the electronic device connected to the base station may be described as a user equipment (UE).

Figure 2:
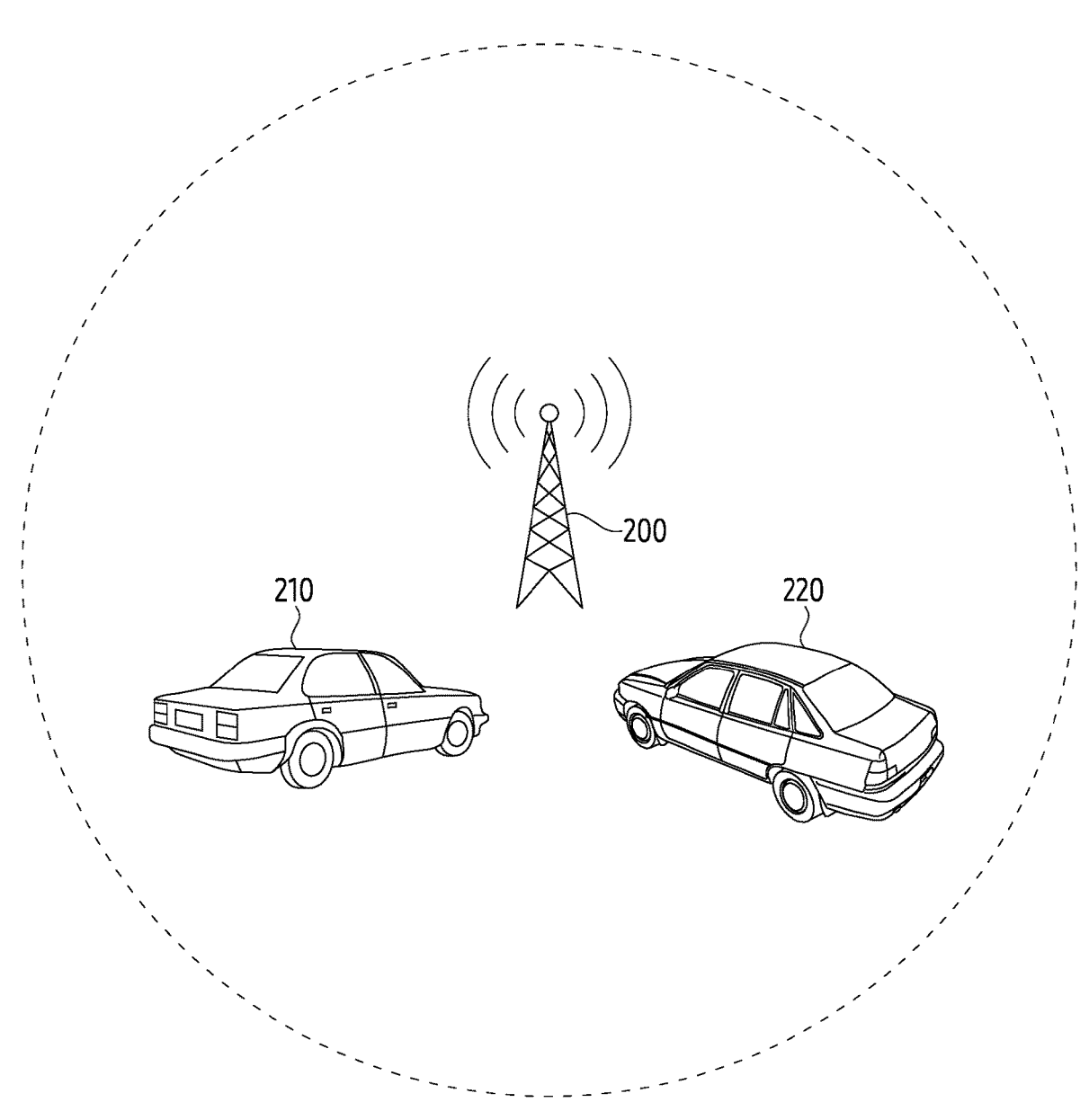
FIG. 2 is a diagram for describing an example of side link communication in NR.

FIG. 2 is a diagram for describing an example of side link communication in NR.

Referring to FIG. 2, the UE 1 210 and the UE 2 220 may directly perform side link communication without passing through the BS 200. The UE 1 210 and the UE 2 220 may be in a state connected to the BS 200. In other words, the UE 1 210 and the UE 2 220 may be located within the coverage of the BS 200.

According to an embodiment, the UE 1 210 and the UE 2 220 may receive information on a resource (or information on resource scheduling) to perform the side link communication from the BS 200. The UE 1 210 and the UE 2 220 may identify a resource to perform side link communication based on information on a resource to perform side link communication received from the BS 200. The UE 1 210 and the UE 2 220 may perform side link communication through the identified resource.

Specifically, the BS 200 may include information on a plurality of resources in a downlink control information (DCI) through a physical downlink control channel (PDCCH) and transmit the information. A detailed description of the DCI will be described later.

Figure 3:
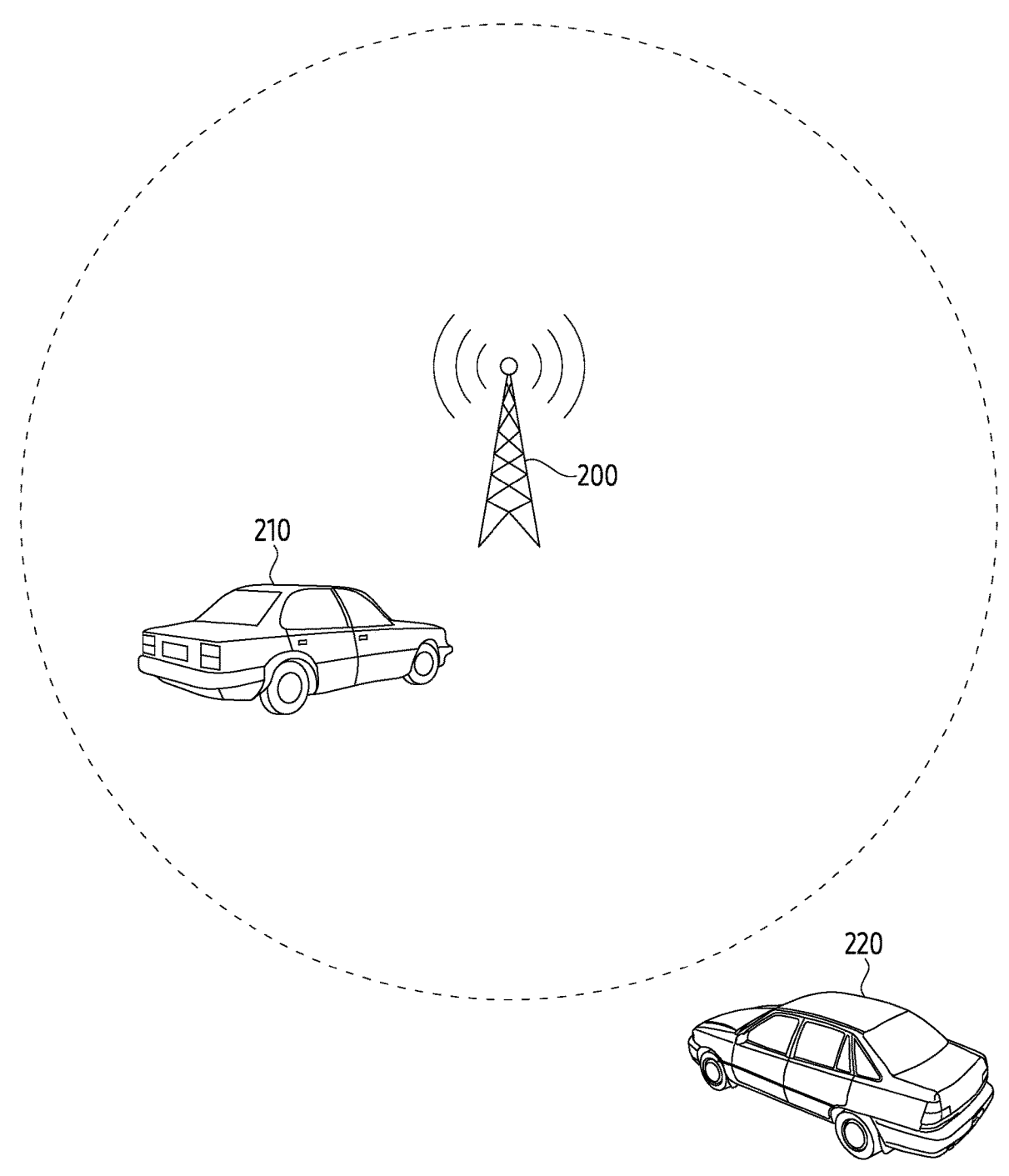
FIG. 3 is a diagram for describing another example of side link communication in NR.

FIG. 3 is a diagram for describing another example of side link communication in NR.

Referring to FIG. 3, unlike FIG. 2, only the UE 1 210 may be connected to the BS 200, and the UE 2 220 may not be connected to the BS 200.

According to an embodiment, only the UE 1 210 of the UE 1 210 and the UE 2 220 may receive information (or information on a resource pool) on a plurality of resources from the BS 200. The UE 1 210 may select a resource unit from among a plurality of resources and transmit a signal to the UE 2 220 through the selected resource. In addition, the UE 2 220 may identify a resource selected by the UE 1 210 and perform side link communication through the resource selected by the UE 1 .

In FIG. 3, an embodiment of receiving information on a plurality of resources through the BS 200 when only the UE 1 210 is connected to the BS 200 and the UE 2 220 is not connected to the BS 200 has been described, but the above embodiment may be applied to the situation of FIG. 2.

Specifically, the UE 1 210 may perform side link communication by transmitting the SCI (side link control information) to the UE 2 220 through the PSCCH (physical side link shared channel) and transmitting data to the UE 2 220 through the PSSCH (physical side link shared channel) based on the SCI. A detailed description of the SCI will be described later.

Hereinafter, the DCI and the SCI may be described.

First, an example of a DCI format may be described. The DCI format may be configured as shown in Table 1 below.

TABLE 1

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources as defined in Clause 9.3.1 of [10, TS 38.473] |
| 2_6 | Notifying the power saving information outside DRX Active Time for one or more UEs |
| 3_0 | Scheduling of NR sidelink in one cell |
| 3_1 | Scheduling of LTE sidelink in one cell |

Referring to Table 1, the DCI format may include a DCI format 0, a DCI format 1, and a DCI format 2.

The DCI format 0 may include a DCI format 0_0, a DCI format 0_1 and a DCI format 0_2. The DCI format 0 may be used in uplinks.

The DCI format 0_0 may be used for scheduling the PUSCH in one cell (or uplink (UL) cell). The DCI format 0_1 may be used for scheduling one or more PUSCHs in one cell. The DCI format 0_1 may be used to indicate downlink feedback information (DFI) for configured grant PUSCH. The DCI format 0_0 and the DCI format 0_1 may be used for eMBB.

The DCI format 0_2 may be used for scheduling the PUSCH in one cell. The DCI format 0_2 may be used for URLLC.

Meanwhile, in the unlicensed band (or sharing spectrum), the DCI format 0 may include information different from the above-described information.

For example, the DCI formats 0_0 and 0_1 may include an indicator indicating a channel access type.

For example, in the unlicensed band, the DCI format 0_1 may include an indicator indicating whether it is downlink feedback indication (DFI) or uplink grant.

The DCI format 1 may include a DCI format 1_0, a DCI format 1_1 and a DCI format 1_2. The DCI format 1 may be used in downlink.

The DCI format 1_0 may be used for scheduling a PDSCH in one cell (or a downlink (DL) cell). The DCI format 1_1 may be used for scheduling the PDSCH in one cell. DCI format 1_1 may be used to trigger one shot HARQ (hybrid automatic repeat and request)-ACK (acknowledgement) codebook feedback. The DCI format 1_0 and the DCI format 1_1 may be used for eMBB.

The DCI format 1_2 may be used for scheduling the PDSCH in one cell. The DCI format 1_2 may be used for URLLC.

Meanwhile, in an unlicensed band (or sharing spectrum), the DCI format 1 may include information different from the above-described information. For example, the DCI formats 1_0 and 1_1 may include an indicator indicating a channel access type.

The DCI format 2 may include a DCI format 2_0, a DCI format 2_1, a DCI format 2_2, a DCI format 2_3, a DCI format 2_4, a DCI format 2_5, and a DCI format 2_6. The DCI format 2 may be used for special purposes.

The DCI format 2_0 may be used to inform a slot format, a channel occupancy time (COT) duration, a possible resource block (RB) sets, and a search space set group switching.

For example, the DCI format 2_0 may include a slot format indicator. The slot format indicator may indicate whether a symbol is DL, UL, or flexible in the corresponding slot.

Meanwhile, in the unlicensed band, the DCI format 2_0 may be used in the same format. However, information indicated by the DCI format 2_0 may be changed. For example, through DCI format 2_0, in which band the channel is occupied may be indicated for each resource. In other words, the DCI format 2_0 may include information indicating whether a corresponding channel is empty.

The DCI format 2_1 may be used to inform a physical resource block (PRB)(s) and OFDM symbol(s) that the UE assume will not transmit under its own intention. In other words, the DCI format 2_1 may include information for indicating not to listen to a signal in a corresponding slot.

The DCI format 2_2 may be used to transmit a transmit power control (TPC) command for PUCCH and PUSCH. In other words, the DCI format 2_2 may be used for uplink power control.

The DCI format 2_3 may be used to transmit a group of TPC commands for sounding reference signal (SRS) transmission by one or more UEs. In other words, the DCI format 2_3 may be used for uplink power control.

The DCI format 2_4 may be used to inform the PRB(s) and OFDM symbol(s) that cancel uplink transmission. In other words, the DCI format 2_4 may include an uplink cancellation indicator.

The DCI format 2_5 may be used to inform availability of soft resource. In other words, the DCI format 2_5 may include an indicator for IAB node support.

The DCI format 2_6 may be used to inform power saving information outside a DRX (Discontinuous Reception) active time for one or more UEs. In other words, the DCI format 2_6 may include a DRX activation indicator.

The DCI format 3 may include a DCI format 3_0 and a DCI format 3_1.

The DCI format 3_0 may be used for NR side links in one cell.

The DCI format 3_1 may be used for a long-term evolution (LTE) side link in one cell.

Hereinafter, an example of an SCI format may be described.

The above-described DCI refers to control information transmitted by the BS to the UE through the PDCCH, but the SCI may refer to control information that the UE transmits to another UE through the PSCCH. The SCI may be transmitted in two steps, and a detailed operation related thereof may be described below.

The first UE may transmit the first SCI (e.g., 1st-stage SCI) to the second UE through the PSCCH. The first SCI may include information for scheduling the PSSCH. Thereafter, the first UE may transmit the second SCI.

The second SCI may be transmitted to the second UE through the PSSCH. The second UE may identify information for scheduling the PSSCH and decode the second SCI based on the first SCI. For example, the second SCI may be piggybacked together with data through the PSSCH and transmitted to the second UE.

Meanwhile, the first SCI transmitted through the PSCCH may be used to schedule the second SCI and the PSSCH. The first SCI may include SCI format 1-A.

Meanwhile, the second SCI transmitted through the PSSCH may be used to transmit side link scheduling information. The second SCI may include a SCI format 2-A and/or a SCI format 2-B. The SCI format 2-A and the SCI format 2-B may be used to decode the PSSCH.

Hereinafter, a frequency band used in NR may be described.

A frequency band (or frequency range) used in NR may be divided into a first type and a second type. The first type of frequency band may be referred to as FR (Frequency Range) 1. The second type of frequency band may be referred to as FR 2.

For example, the ranges of the first type frequency band and the second type frequency band may be configured as shown in Table 2.

TABLE 2

| Frequency Range designation | Corresponding frequency range | Subcarrier Spacing (SCS) |
|---|---|---|
| FR 1 | 450 MHz-6000 MHz | 15, 30, 60 kHz |
| FR 2 | 24250 MHz-52600 MHz | 60, 120, 240 kHz |

Referring to Table 2, the FR 1 may be configured in a band of 450 MHz to 6000 MHz. The FR 2 may be configured in a band of 24250 MHz to 52600 MHz. The specific frequency values described in Table 2 are exemplary and may be changed.

Figure 4:
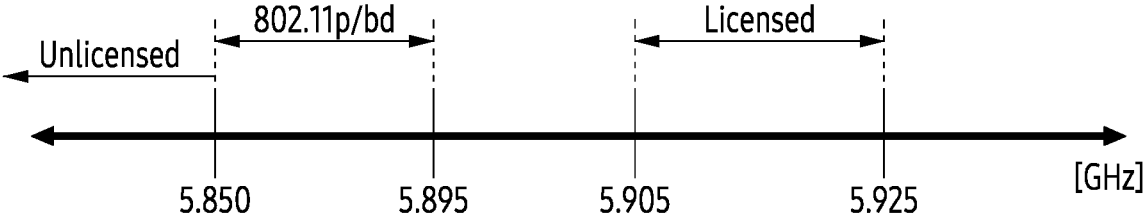
FIG. 4 illustrates a band plan of 5.9 GHz.

FIG. 4 illustrates a band plan of 5.9 GHz.

Referring to FIG. 4, the 5.9 GHz band may include an unlicensed band and a licensed band. The specific frequency range shown in FIG. 4 may be set differently for each country and may be changed.

For example, 20 MHz, from 5.905 GHz to 5.925 GHz, may be set as the licensed band and maybe be used for V2X communication (or C-V2X communication). In addition to the licensed band of 20 MHz, 10 MHz from 5.895 GHz to 5.905 GHz may also be set as the licensed band.

For example, 45 MHz from 5.850 GHz to 5.895 GHz may be used for wireless Internet (e.g., 802.11p/bd).

A band equal to or less than 5.850 GHz or greater than 5.925 GHz may be set as the unlicensed band. The unlicensed band may be used for a various purposes, and for example, it may be used for communication for a vehicle (e.g., self-driving). The unlicensed band may be referred to as a sharing spectrum.

For C (Cellular)-V2X communication, discussion for the integrity (or URLLC) of communication connections is currently in progress, but a procedure for securing the amount of transmitted data (or the amount of received data) is not defined, a method for securing it may be required.

According to various embodiments, a spectrum of a band for C-V2X communication and an unlicensed band are set separately, but the unlicensed band may be used to secure the amount of transmitted and received data in C-V2X communication.

Accordingly, in the following specification, various embodiments for using an unlicensed band in C-V2X communication may be described.

As described above, the DCI format for communication in the unlicensed band is set, but the SCI format is not set. Therefore, it is necessary to further include additional information in the SCI format to perform C-V2X communication in the unlicensed band. Hereinafter, an embodiment in which additional information is included in an SCI format in order to perform C-V2X communication in the unlicensed band may be described.

According to an embodiment, information on channel access may be included in the SCI format (e.g., SCI format 1 or SCI format 2). In other words, an indicator indicating a channel access type may be included in the SCI format. The indicator indicating the channel access type may be set as shown in Table 3.

TABLE 3

| indicator | description |
|---|---|
| ChannelAccess-CPext | 0, 1, 2, 3 or 4 bits. The bitwidth for this field is determined as $\lceil \log_2(I) \rceil$ bits, where I is the number of entries in the higher layer parameter ul-AccessConfigListDCI-1-1 or in Table 7.3.1.1.1-4A if ChannelAccessMode-r16 = "semistatic" is provided for operation in a cell with shared spectrum channel access; otherwise 0 bit. One or more entries from Table 7.3.1.2.2-6 are configured by the higher layer parameter ul-AccessConfigListDCI-1-1. |

Referring to Table 3, the size of the information on the channel access may be set based on an higher layer parameter (i.e., AccessConfigListDCI-1-1) set from radio resource control (RRC) signaling. The AccessConfigListDCI-1-1 may mean a list of combinations of a cyclic prefix (CP) extension and an uplink channel access type. In other words, the size of the channel access information (i.e., ChannelAccess-CPext) may be set to one of 1 to 4 bits of information.

According to an embodiment, information for feedback request may be included in the SCI format (e.g., SCI format 1 or SCI format 2). In other words, an indicator for feedback request may be included in the SCI format. The indicator for feedback request may be set as shown in Table 4.

TABLE 4

| indicator | description |
|---|---|
| DFI flag (0 or 1 bit) | 1 bit if the UE is configured to monitor DCI format 0_1 with CRC scrambled by CS-RNTI and for operation in a cell with shared spectrum channel access. For a DCI format 0_1 with CRC scrambled by CS-RNTI, the bit value of 0 indicates activating type 2 CG transmission and the bit value of 1 indicates CG-DFI. For a DCI format 0_1 with CRC scrambled by C-RNTI/SP-CSI-RNTI/MCS-C-RNTI and for operation in a cell with shared spectrum channel access, the bit is reserved. |

Referring to Table 4, the size of the information on the feedback request (i.e., the DFI flag) may be set to 1 bit. For example, the information for requesting feedback may be set to a first value (e.g., 1) for indicating that feedback is requested or a second value (e.g., 0) for indicating that feedback is not requested.

According to an embodiment, information on channel occupancy may be included in the SCI format (e.g., SCI format 1 or SCI format 2). In other words, an indicator for indicating whether a channel is occupied may be included in the SCI format. The indicator for indicating whether a channel is occupied may be set as shown in Table 5.

TABLE 5

| condition | indicator |
|---|---|
| the higher layer parameter availableRB-SetsToAddModList is configured | Available RB set Indicator 1, Available RB set Indicator 2, . . . , Available RB set Indicator N1, |
| the higher layer parameter co-DurationsPerCellToAddModList is configured | COT duration indicator 1, COT duration indicator 2, . . . , COT duration indicator N2 |
| the higher layer parameter switchTriggerToAddModList is configured | Search space set group switching flag 1, Search space set group switching flag 2, . . . , Search space set group switching flag M |

Referring to Table 5, when each condition is satisfied, an indication according to each condition may be included in the SCI format.

For example, when an higher layer parameter is configured as "availableRB-SetsToAddModList" through RRC signaling, Available RB set Indicators 1 to N1 may be included in the SCI format.

For example, when an higher layer parameter is configured as "co-DurationsPerCellToAddModList" through RRC signaling, COT duration indicators 1 to N2 may be included in the SCI format.

For example, when an higher layer parameter is configured as "switchTriggerToAddModList" through RRC signaling, Search space set group switching flags 1 to M may be included in the SCI format.

According to the above-described embodiments, the SCI format may include information on channel access, information for feedback request, or information on channel occupancy. Since the SCI format includes two formats, information on channel access, information for feedback request, or information on channel occupancy may be included in one of the two SCI formats.

Accordingly, at least one of the first SCI transmitted through the PSCCH and the second SCI transmitted through the PSSCH may include information on channel access, information for feedback request, or information on channel occupancy. For example, information on channel access, information for requesting feedback, or information on channel occupancy may be included only in the second SCI.

The transmitting UE and the receiving UE may identify in advance through RRC signaling that the first SCI and the second SCI may include the above-described information (e.g., information on channel access, information for feedback request, or information on channel occupancy). In this case, the transmitting UE and the receiving UE may identify that the above-described information is included in the first SCI and the second SCI through a DCI including a simple index from the BS.

When the above-described information (e.g., information on channel access, information for feedback request, or information on channel occupancy) is included in at least one of the first SCI and the second SCI, a detailed operation for the UE to perform side link communication may be described below.

Figure 5:
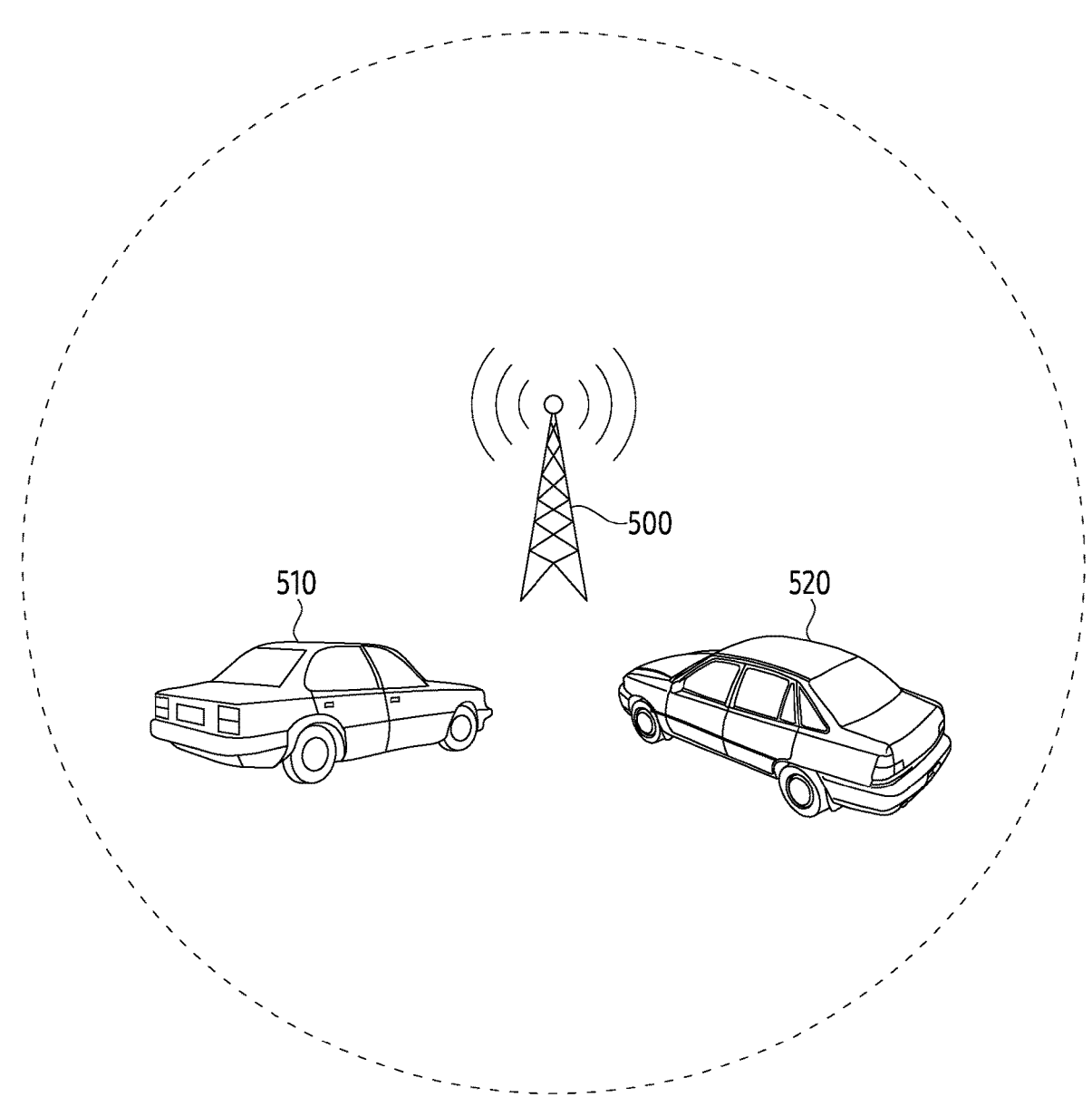
FIG. 5 illustrates an example in which side link communication is performed in an unlicensed band.

FIG. 5 illustrates an example in which side link communication is performed in an unlicensed band.

Referring to FIG. 5, the UE 1 510 and the UE 2 520 may be located in coverage of the BS 500. The BS 500 may perform radio resource control (RRC) signaling with the UE 1 510. Based on the RRC signaling, the UE 1 510 may obtain (or receive) information on an unlicensed band to be operated (or usable).

The RRC signaling may be performed in the RRC layer of the BS 500 and the UE 1 510. The RRC layer may serve to control the radio resources of the UE 1 510 and the BS 500. The BS 500 and The UE 1 510 may control configuration, reconfiguration, and release of radio bearers by exchanging RRC messages with each other.

Accordingly, the BS 500 may transmit information on an unlicensed band to be operated by the UE 1 510 to the RRC message. The UE 1 510 may receive information on an unlicensed band to be operated through an RRC message from the BS 500.

According to an embodiment, the UE 1 510 may identify whether UE 2 520 can communicate in the unlicensed band in order to perform side link communication with the UE 2 520 in the unlicensed band. The UE 1 510 and the UE 2 520 may identify whether communication in the unlicensed band is possible by exchanging capability information on communication in the unlicensed band.

For example, the UE 1 510 may identify whether there is a UE (e.g., UE 2 520) capable of communication in its vicinity through the sensing (or discovery) process. The UE 1 510 may identify the UE 2 520 and transmit an indicator notifying that unlicensed communication is possible to the UE 2 520.

For example, the UE 1 510 may transmit capability information regarding communication in the unlicensed band to the UE 2 520. When the UE 2 520 is capable of communication in the unlicensed band, the UE 2 520 may transmit capability information regarding communication in the unlicensed band to the UE 1 510.

According to an embodiment, the UE 1 510 may receive a DCI related to the unlicensed band from the BS 500. The DCI may include information on a channel (or resource) in the unlicensed band for performing communication with the UE 2 520. For example, the UE 1 510 may receive information on channels 1 to 7 in the unlicensed band from the BS 500.

Thereafter, the UE 1 510 may determine a channel to perform side link communication with the UE 2 520 based on information on a channel in the unlicensed band. The UE 1 510 may transmit information on the determined channel to the UE 2 520. The UE 1 510 and the UE 2 520 may perform communication within the unlicensed band based on the determined channel. For example, the UE 1 510 may transmit the first SCI to the UE 2 520 through the PSCCH. The UE 1 510 may transmit the second SCI to the UE 2 520 through the PSSCH. At least one of the first SCI and the second SCI may include information on the determined channel.

FIG. 5 illustrates an embodiment in which the UE 1 510 receives information on a channel (or resource) in an unlicensed band for communicating with the UE 2 520 from the BS 500 and determines a channel in the unlicensed band based thereon, but is not limited thereto. The UE 2 520 may also receive information on a channel (or resource) in the unlicensed band from the BS 500 and determine a channel in the unlicensed band based on thereon.

Figure 6:
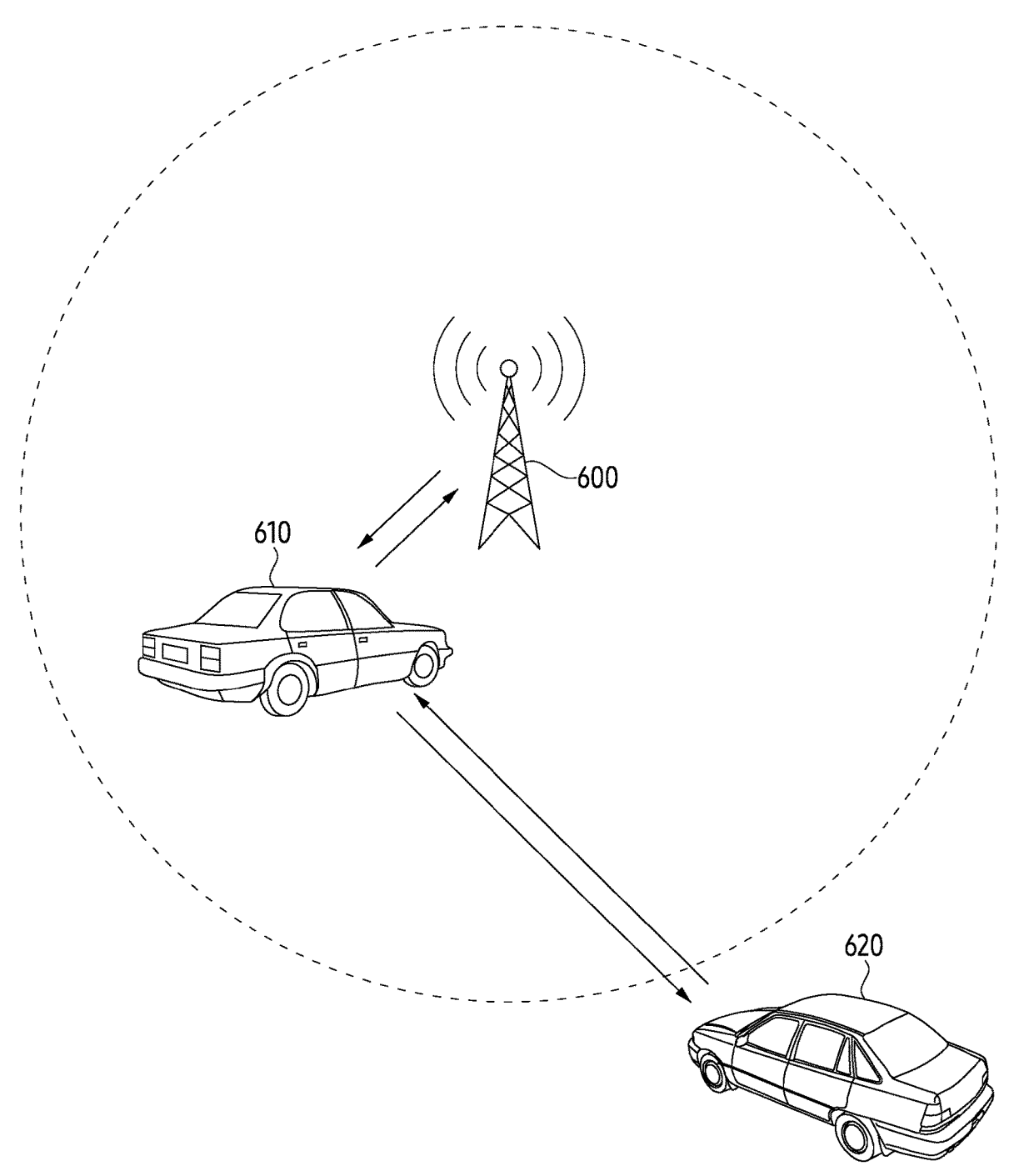
FIG. 6 illustrates another example in which side link communication is performed in an unlicensed band.

FIG. 6 illustrates another example in which side link communication is performed in an unlicensed band.

Referring to FIG. 6, only the UE 1 610 of the UE 1 610 and the UE 2 20 may be located in the coverage of the BS 600. In this case, the UE 1 610 may select a channel (or resource) to perform the side link communication by itself, and may perform side link communication with the UE 2 620 through the selected channel.

In FIG. 6, an embodiment in which the UE 1 610 selects a resource for performing side link communication by itself and performs side link communication with the UE 2 620 through the selected channel has been described, but is not limited thereto. The UE 2 620 outside the coverage of the BS 600 may also select a resource to perform the side link communication by itself, and may perform side link communication with the UE 1 610 through the selected channel.

According to an embodiment, the UE 1 610 and the UE 2 620 may determine a condition for initiating communication through the unlicensed band. For example, when the reliability of communication with the UE 2 620 within the licensed band is less than or equal to a designated value, the UE 1 10 may perform communication in the unlicensed band. Accordingly, while performing communication with the UE 2 620 in the licensed band, the UE 1 610 may identify that the reliability of communication with the UE 2 620 in the licensed band is less than or equal to a designated value. The UE 1 610 may request the UE 2 620 to communicate in the unlicensed band based on identifying that the reliability of communication with the UE 2 620 is less than or equal to a designated value within the licensed band. The UE 2 620 may respond (or permit) to communication in the unlicensed band with the UE 1 610 and may perform communication (i.e., side link communication) with the UE 1 610.

In addition, the UE 2 620 may request the UE 1 610 to communicate in the unlicensed band based on identifying that the reliability of communication with UE 1 610 is less than or equal to a designated value.

The above-described embodiment is an embodiment that, while the UE 1 610 and the UE 2 620 perform communication in the licensed band, the UE 1 610 changes a band for communication to the unlicensed band. Hereinafter, contrary to the above-described embodiment, an embodiment in which a band is changed to communication in a licensed band while the UE 1 610 and the UE 2 620 perform communication in the unlicensed band may be described.

According to an embodiment, the UE 1 610 and the UE 2 620 may determine a condition for initiating communication through the licensed band. For example, when the reliability of communication with the UE 2 620 within the unlicensed band is less than or equal to a designated value, the UE 1 610 may perform communication within the licensed band. Accordingly, while communicating with the UE 2 620 in the unlicensed band, the UE 1 610 may identify that the reliability of communication with the UE 2 620 in the unlicensed band is less than or equal to a designated value. The UE 1 610 may request the UE 2 620 to communicate in the licensed band based on identifying that the reliability of communication with the UE 2 620 is less than or equal to a designated value within the unlicensed band. The UE 2 620 may respond (or permit) to communication in the licensed band with the UE 1 610 and may perform communication (i.e., side link communication) with the UE 1 610.

In the following description, an example in which the first user equipment and the second user equipment operate a licensed band and an unlicensed band to transmit and receive data through side link communication will be described according to another embodiment.

For example, when performing side link communication, the first equipment and second user equipment may transmit and receive low-capacity data below the threshold through the licensed band, and transmit and receive large amounts of data exceeding the threshold through the unlicensed band.

For example, when performing side link communication, the first user equipment and the second user equipment may transmit/receive data having high reliability through a licensed band, and may transmit/receive data having somewhat low reliability through an unlicensed band. In this case, the data having high reliability may include personal information of the user equipment user, login information, financial information, PAYMENT INFORMATION, and the like.

For example, the first user equipment and the second user equipment may transmit and receive data requiring encryption through the licensed band when performing side link communication, and may transmit and receive data that does not require encryption through the unlicensed band. In this case, the data requiring encryption may include personal information of the user equipment user, login information, financial information, PAYMENT INFORMATION, and the like.

For example, the first user equipment and the second user equipment may transmit and receive data requiring urgency through the licensed band when performing side link communication, and may transmit and receive data not requiring urgency through the unlicensed band. In this case, the data requiring urgency may include disaster information, emergency information, accident information, emergency braking information, and the like.

For example, the first user equipment and the second user equipment may transmit and receive data related to vehicle software update notification when performing side link communication through the licensed band, and may transmit and receive data for vehicle software update through the unlicensed band.

For example, the first user equipment and the second user equipment may transmit and receive data that attribute is mandatory when performing side link communication through the licensed band, and transmit and receive data that attribute is optional through the unlicensed band.

For example, when the first user equipment and the second user equipment perform side link communication, the upload data may be transmitted and received through the licensed band, and the download data may be transmitted and received through the unlicensed band.

For example, the first user equipment and the second user equipment may transmit and receive a resource indicator indicating a resource for communication when performing side link communication through a licensed band, and may transmit and receive data through resources included in the unlicensed band. Specifically, the first user equipment and the second user equipment may transmit and receive data through the resource of an unlicensed band indicated by the resource indicator transmitted and received through the licensed band.

For example, the first user equipment and the second user equipment may transmit and receive control information for the first user equipment to control the second user equipment when performing side link communication through the license band, may transmit and receive ACK/NACK information or feedback information on the control information through the unlicensed band.

An example in which the above-described the first user equipment and the second user equipment operate the licensed band and the unlicensed band through side link communication is only an embodiment, and as the opposite case to the above-described example, the licensed band and the unlicensed band may be operated.

FIG. 7 illustrates an example of an operation of a first user equipment according to various embodiments.

Referring to FIG. 7, in operation 710, the first user equipment UE (e.g., a processor of the first user equipment) may receive the first SCI from the second user equipment through a PSCCH set within the unlicensed band. For example, the unlicensed band may include the 5.9 GHz band or at least a part of the 5.9 GHz band.

In operation 720, the first user equipment may receive the second SCI from the second user equipment through the PSSCH.

According to an embodiment, the PSSCH may be determined based on the PSCCH. The first SCI may include information on the PSCCH. For example, the first SCI may include information for scheduling the PSSCH. Accordingly, the second user equipment may determine the PSCCH based on the first SCI. The second SCI may be used to transmit side link scheduling information.

According to an embodiment, the first SCI and the second SCI may be configured in different formats. For example, the first SCI may include a SCI format 1-A. The second SCI may include a SCI format 2-A and/or a SCI format 2-B.

In operation 730, the first user equipment may identify information for performing communication with the second user equipment within the unlicensed band.

According to an embodiment, the first user equipment may identify information for performing side link communication with the second user equipment within the unlicensed band based on at least one of the first SCI and the second SCI.

For example, at least one of the first SCI and the second SCI may include information on channel access, information for feedback request, or information on channel occupancy. As an example, the first SCI may include information on channel access, and the second SCI may include information for feedback request and information on channel occupancy. As another example, the second SCI may include all of information on channel access, information for feedback request, and information on channel occupancy.

As an example, the size of the information on the channel access may be set to one of 1 to 4 bits. The size of the information on the channel access may be set based on the higher layer parameter set from radio resource control (RC) signaling. In other words, the size of the information on the channel access may be determined based on the number of entries in the ul-AccessConfigListDCI-1-1, which is an higher layer parameter.

For example, the size of the information for the feedback request may be set to 1 bit. The information for feedback request may be set to a first value (e.g., 1) for indicating that feedback is requested or a second value (e.g., 0) for indicating that feedback is not requested.

For example, the information on channel occupancy may indicate whether a corresponding channel is empty.

In operation 740, the first user equipment may receive data from the second user equipment through a side link communication path between the first user equipment and the second user equipment.

According to an embodiment, the first user equipment may receive data from the second user equipment through a side link communication path between the first user equipment and the second user equipment based on information for performing side link communication within the unlicensed band.

For example, the first user equipment may receive data from the second user equipment through the PSSCH.

Figure 8:
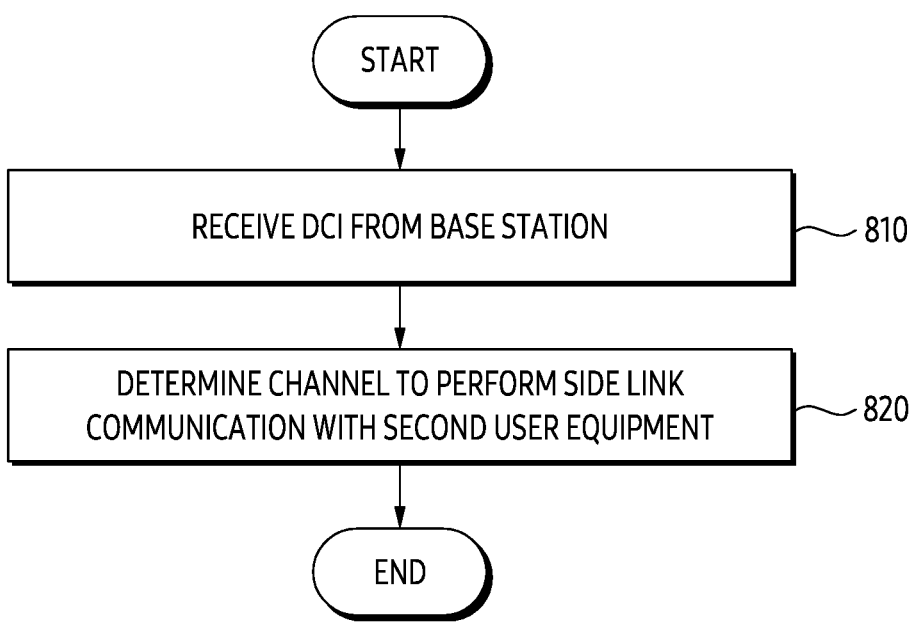
FIG. 8 illustrates another example of an operation of a first user equipment according to various embodiments.

FIG. 8 illustrates another example of an operation of a first user equipment according to various embodiments.

Referring to FIG. 8, in operation 810, the first user equipment (e.g., a processor of the first user equipment) may receive a DCI from a base station. For example, the DCI may be transmitted through a physical downlink control channel (PDCCH).

For example, the DCI may include information on a channel in the unlicensed band for performing side link communication with the second user equipment. As an example, the information on the channel may include information on channels (or resources) that may be used as side link communication. In other words, the base station may allocate channels that may be used for side link communication in the first user equipment. The first user equipment may be allocated channels usable for side link communication from the base station.

In operation 820, the first user equipment may determine a channel for performing side link communication with the second user equipment.

For example, the first user equipment may be allocated channels that may be used as side link communication based on information on a channel in an unlicensed band for performing side link communication with a second user equipment included in the DCI, and determine a channel for actually performing side link communication among the channels.

Operation 810 and operation 820 of FIG. 8 may be performed when the first user equipment belongs to the coverage of the base station, and may be performed before operation 710 of FIG. 7 is performed. In other words, the first user equipment may be allocated channels usable for side link communication from the base station, and may determine a channel for performing side link communication among the allocated channels. Thereafter, the first user equipment may perform side link communication with the second user equipment by performing operations 710 to 740 illustrated in FIG. 7.

Figure 9:
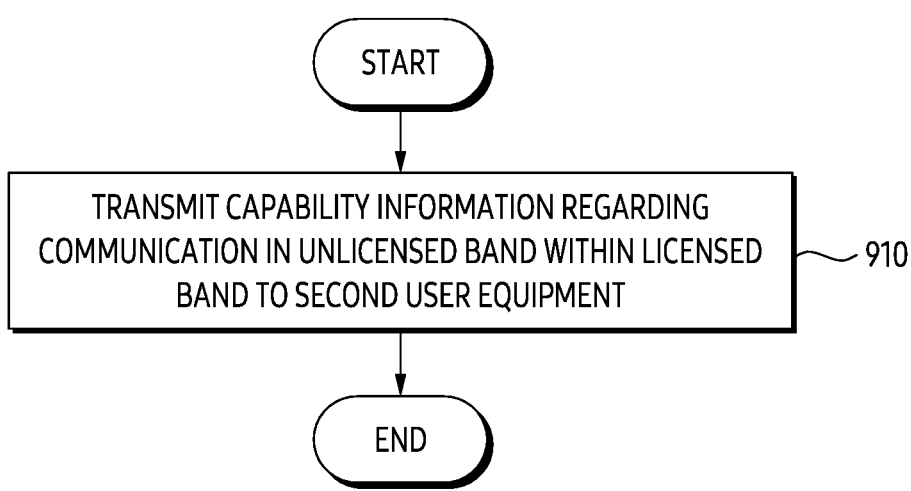
FIG. 9 illustrates still another example of an operation of a first user equipment according to various embodiments.

FIG. 9 illustrates still another example of an operation of a first user equipment according to various embodiments.

Referring to FIG. 9, in operation 910, the first user equipment may transmit, within the licensed band to the second user equipment, capability information regarding communication (e.g., side link communication) in the unlicensed band.

According to an embodiment, the first user equipment may be in a state of operating in the licensed band. The first user equipment may sense (or perform a discovery process) a communicable device in its vicinity. The first user equipment may identify that the second user equipment exists in its vicinity.

Thereafter, the first user equipment may identify whether communication with the second user equipment in an unlicensed band may be performed. The first user equipment may transmit capability information (i.e., capability information of the first user equipment) regarding communication in the unlicensed band to the second user equipment within the licensed band. The first user equipment may receive capability information (i.e., capability information of the second user equipment) regarding communication in the unlicensed band from the second user equipment within the licensed band. In other words, the first user equipment and the second user equipment may identify whether the first user equipment and the second user equipment can communicate in the unlicensed band by exchanging capability information on communication in the unlicensed band.

According to an embodiment, the first user equipment may determine a condition for initiating communication (e.g., side link communication) in the unlicensed band with the second user equipment.

For example, the first user equipment may initiate communication in the unlicensed band when an error in communication with the second user equipment occurs in the licensed band.

As another example, the first user equipment may initiate communication in the unlicensed band when data that needs to be transmitted and received is excessively generated while communicating with the second user equipment in the licensed band. As an example, data that needs to be transmitted from the first user equipment to the second user equipment may be excessively generated. The first user equipment may communicate with the second user equipment in the unlicensed band by transmitting a buffer status report (BSR) to the base station and being allocated communicable channels within the unlicensed band.

As another example, the first user equipment may initiate communication in the unlicensed band when the reliability of communication with the second user equipment in the licensed band is less than or equal to the designated value. A detailed operation of the example may be described in FIG. 10 below.

Operation 910 illustrated in FIG. 9 may be performed before the operation 710 of FIG. 7. Accordingly, the first user equipment may identify the second user equipment in its vicinity and determine that communication with the second user equipment is possible in the unlicensed band. Thereafter, the first user equipment may perform the side link communication with the second user equipment by performing operations 710 to 740 illustrated in FIG. 7.

Figure 10:
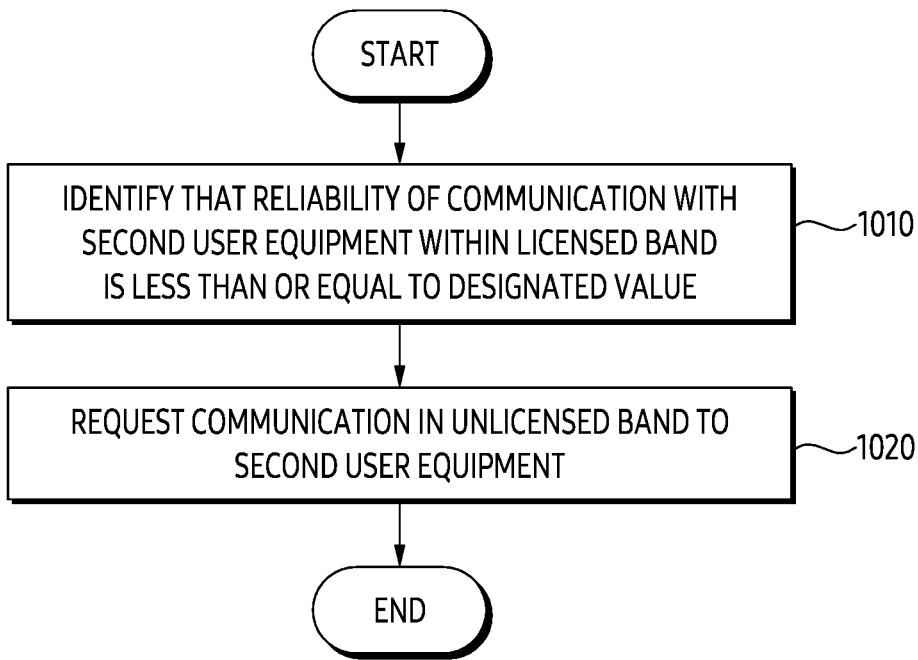
FIG. 10 illustrates still another example of an operation of a first user equipment according to various embodiments.

FIG. 10 illustrates still another example of an operation of a first user equipment according to various embodiments.

Referring to FIG. 10, in operation 1010, the first user equipment (e.g., the processor of the first user equipment) may identify that the reliability of communication (e.g., side link communication) with the second user equipment in the licensed band is less than or equal to a designated value.

According to an embodiment, the first user equipment may perform side link communication with the second user equipment within the licensed band. While the first user equipment and the second user equipment perform side link communication within the licensed band, the first user equipment may identify that the reliability of communication with the second user equipment is less than or equal to a designated value. In the case of V2X communication, ultra-high reliability may be required. Accordingly, the first user equipment may use the unlicensed band for ultra-high reliability communication with the second user equipment.

In operation 1020, the first user equipment may request the second user equipment to communicate in the unlicensed band.

According to an embodiment, the first user equipment may request the second user equipment to communicate in the unlicensed band based on identifying that the reliability of communication with the second user equipment within the licensed band is less than or equal to the designated value.

The first user equipment may receive a response to a communication request in the unlicensed band from the second user equipment. Based on the response, the first user equipment may perform communication with the second user equipment in the unlicensed band.

Figure 11:
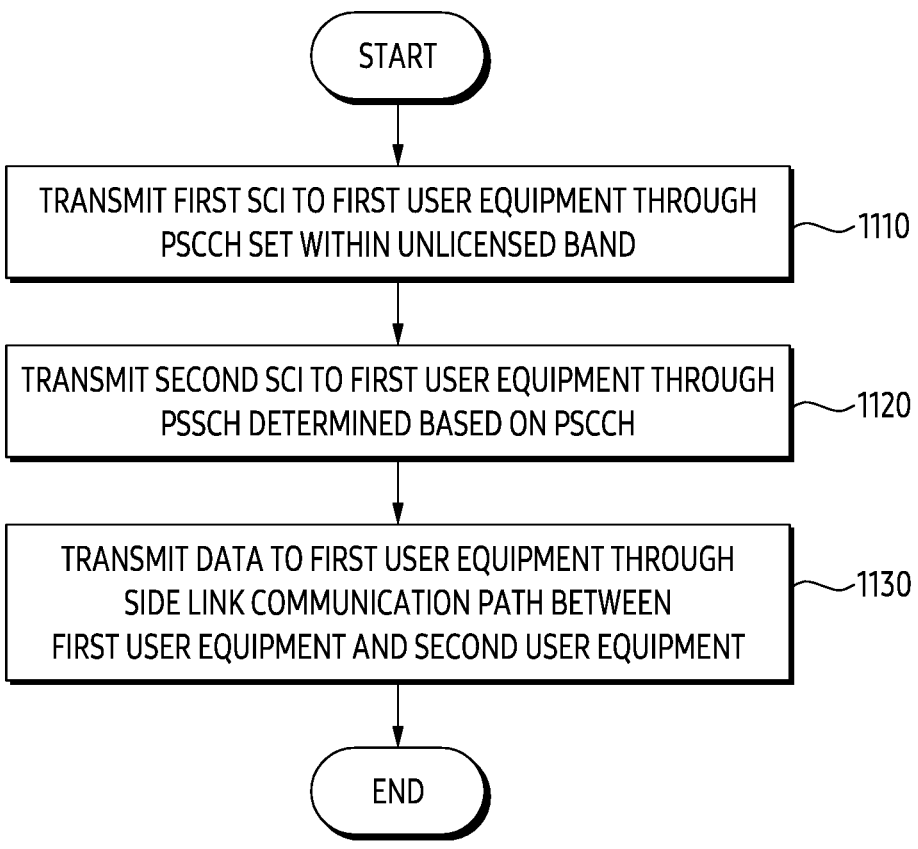
FIG. 11 illustrates an example of an operation of a second user equipment according to various embodiments.

FIG. 11 illustrates an example of an operation of a second user equipment according to various embodiments.

Referring to FIG. 11, in operation 1110, the second user equipment (UE) (e.g., a processor of the second user equipment) may transmit the first side link control information (SCI) to the first user equipment through a physical side link control channel (PSCCH) set within the unlicensed band. For example, the unlicensed band may include at least a portion of the 5.9 GHz band or the 5.9 GHz band.

According to an embodiment, before performing operation 1110, the second user equipment may transmit capability information regarding communication of the unlicensed band within the licensed band. The second user equipment may identify that communication with the first user equipment is possible in the unlicensed band by exchanging capability information on communication in the unlicensed band with the first user equipment.

According to an embodiment, the second user equipment may determine information for performing side link communication with the first user equipment within the unlicensed band. For example, the information for performing the side link communication within the unlicensed band may include information on channel access, information for feedback request, or information on channel occupancy.

In operation 1120, the second user equipment may transmit the second SCI to the first user equipment through a physical side link shared channel (PSSCH) determined based on the PSCCH.

According to an embodiment, the PSSCH may be determined based on the PSCCH. The first SCI may include information on the PSCCH. For example, the first SCI may include information for scheduling the PSSCH. Accordingly, the second user equipment may determine the PSCCH based on the first SCI. The second SCI may be used to transmit side link scheduling information.

According to an embodiment, the first SCI and the second SCI may be configured in different formats. For example, the first SCI may include a SCI format 1-A. The second SCI may include a SCI format 2-A and/or a SCI format 2-B.

According to an embodiment, at least one of the first SCI and the second SCI may include information for performing side link communication.

For example, at least one of the first SCI and the second SCI may include information on channel access, information for feedback request, or information on channel occupancy. For example, the first SCI may include information on channel access, and the second SCI may include information for feedback request and information on channel occupancy.

For example, the size of the information on the channel access may be set to one of 1 to 4 bits. The size of the information on channel access may be set based on the higher layer parameter set from radio resource control (RRC) signaling. In other words, the size of the information on channel access may be determined based on the number of entries in the ul-AccessConfigListDCI-1-1, which is the higher layer parameter.

For example, the size of the information for feedback request may be set to 1 bit. The information for feedback request may be set to a first value (e.g., 1) for indicating that feedback is requested or a second value (e.g., 0) for indicating that feedback is not requested.

For example, the information on channel occupancy a channel may indicate whether the corresponding channel is empty.

In operation 1130, the second user equipment may transmit data to the first user equipment through a side link communication path between the first user equipment and the second user equipment.

According to an embodiment, the second user equipment may transmit data to the first user equipment through the side link communication path between the first user equipment and the second user equipment based on at least one of the first SCI and the second SCI.

For example, the second user equipment may transmit data to the first user equipment through the PSSCH.

Figure 12:
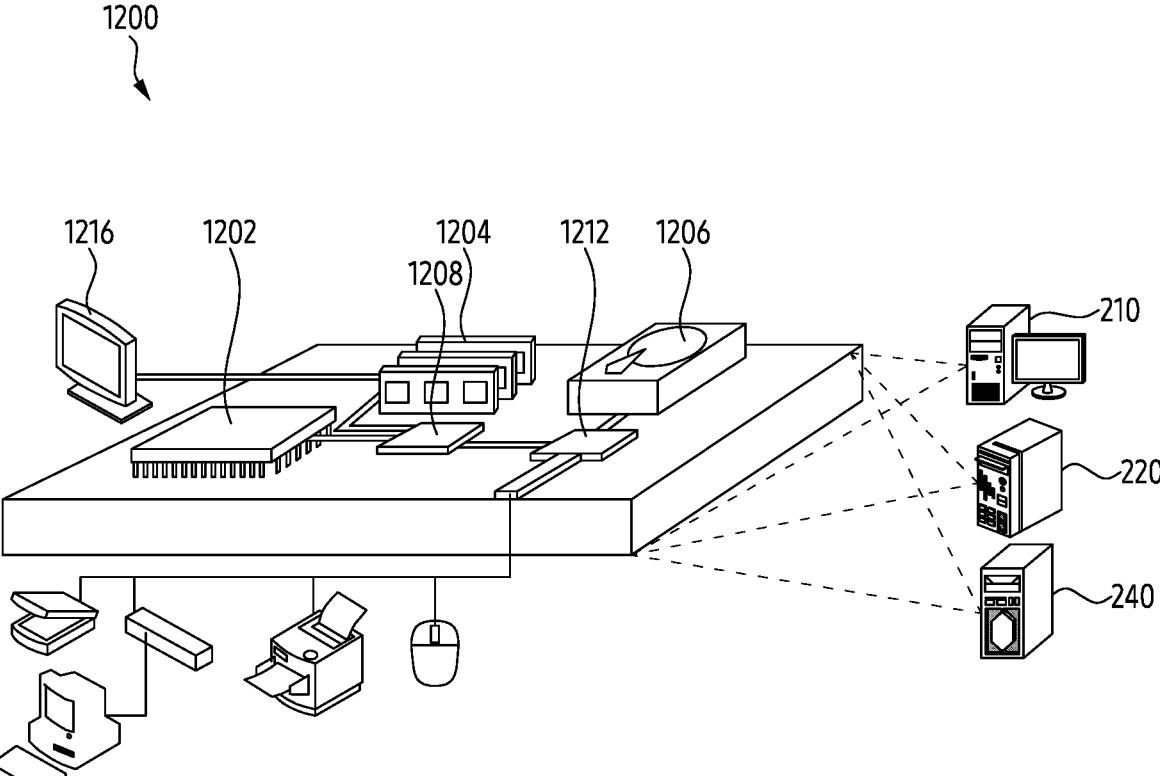
FIG. 12 is a simplified block diagram of user equipment according to various embodiments.

FIG. 12 is a simplified block diagram of electronic devices according to various embodiments.

Referring to FIG. 12, the electronic device 1200 may be an example of the electronic device 210, the electronic device 220, or the electronic device 240. The electronic device 1200 may comprise a processor 1202, a memory 1204, a storage device 1206, high-speed controller 1208 (e.g., northbridge, MCH (Main Controller Hub)) and low-speed controller 1212 (e.g., southbridge, ICH (I/O controller hub)). In the electronic device 1200, each of the processor 1202, the memory 1204, the storage device 1206, the fast controller 1208, and the slow controller 1212 may be interconnected using various buses.

For example, the processor 1202 may process instructions for execution in the electronic device 1200 in order to display graphic information on a graphical user interface (GUI) on an external input/output device such as display 1216 connected to high-speed controller 1208. The instructions may be comprised in the memory 1204 or the storage device 1206. The instructions may cause the electronic device 1200 to perform one or more of the above-described operations when executed by processor 1202. According to embodiments, the processor 1202 may be composed of a plurality of processors including a communication processor and a GPU (graphical processing unit).

For example, the memory 1204 may store information in the electronic device 1200. For example, the memory 1204 may be a volatile memory unit or units. As another example, the memory 1204 may be a nonvolatile memory unit or units. For another example, memory 1204 may be another type of computer-readable medium, such as a magnetic or optical disk.

For example, the storage device 1206 may provide a mass storage space to the electronic device 1200. For example, storage device 1206 may be a computer-readable medium such as a hard disk device, an optical disk device, flash memory, solid state memory devices, or an array of devices in a storage area network (SAN).

For example, the high-speed controller 1208 may manage bandwidth-intensive operations for electronic device 1200, while low-speed controller 1212 may manage low bandwidth-intensive operations for electronic device 1200. For example, the high-speed controller 1208 may be coupled to the memory 1204 and coupled to the display 1216 through a GPU or accelerator, while the low speed controller 1212 may be coupled to the storage device 1206 and coupled to various communication ports (e.g., universal serial bus (USB), Bluetooth, Ethernet, wireless Ethernet) for communication with an external electronic device (e.g., keyboard, transducer, scanner, or network device (e.g., switch or router)).

According to various embodiments, a first user equipment (UE) may comprise a transceiver to transmit and receive a wireless signal; and a processor connected to the transceiver, wherein the processor may be configured to receive first side link control information (SCI) from a second UE through a physical side link control channel (PSCCH) configured in unlicensed band, receive a second SCI from the second UE through a physical side link shared channel (PSSCH) determined based on the PSCCH, wherein the first SCI and the second SCI are configured in different formats, based on at least one of the first SCI and the second SCI, identify information for performing side link communication with the second UE in the unlicensed band, and receive, based on the identified information, data from the second UE through a side link communication path between the first UE and the second UE.

According to an embodiment, the at least one of the first SCI and the second SCI may include information on channel access, information on feedback request, or information on channel occupancy.

According to an embodiment, size of the information on channel access may be set based on an higher layer parameter which is set from radio resource control (RRC) signaling.

According to an embodiment, the information on feedback request may be set a first value for indicating that feedback is requested or a second value for indicating that the feedback is not requested.

According to an embodiment, the processor may be further configured to receive downlink control information (DCI) related to the unlicensed band, wherein the DCI may include information on channel in the unlicensed band for performing the side link communication with the second UE, and determine a channel to performing the side link communication with the second UE.

According to an embodiment, the processor may be further configured to transmit capability information on communication in the unlicensed band to the second UE.

According to an embodiment, the processor may be further configured to identify that reliability of communication with the second UE in licensed band is less than or equal to a designated value while performing the side link communication with the second UE, and based on identifying that the reliability of communication with the second UE in the licensed band is less than or equal to the designated value, request the communication in the unlicensed band.

According to an embodiment, the unlicensed band may include 5.9 GHz band.

According to various embodiments, a method for operating a first user equipment (UE) may comprise receiving first side link control information (SCI) from a second UE through a physical side link control channel (PSCCH) configured in unlicensed band, receiving a second SCI from the second UE through a physical side link shared channel (PSSCH) determined based on the PSCCH, wherein the first SCI and the second SCI are configured in different formats, based on at least one of the first SCI and the second SCI, identifying information for performing side link communication with the second UE in the unlicensed band, and receiving, based on the identified information, data from the second UE through a side link communication path between the first UE and the second UE.

According to an embodiment, the at least one of the first SCI and the second SCI may include information on channel access, information on feedback request, or information on channel occupancy.

According to an embodiment, size of the information on channel access may be set based on an higher layer parameter which is set from radio resource control (RRC) signaling.

According to an embodiment, the information on feedback request may be set a first value for indicating that feedback is requested or a second value for indicating that the feedback is not requested.

According to an embodiment, the method may further comprise receiving downlink control information (DCI) related to the unlicensed band, wherein the DCI includes information on channel in the unlicensed band for performing the side link communication, and determining a channel to performing the side link communication with the second UE.

According to an embodiment, the method may further comprise transmitting capability information on communication in the unlicensed band.

According to an embodiment, the method may further comprise identifying that reliability of communication with the second UE in licensed band is less than or equal to a designated value while performing the side link communication with the second UE, and based on identifying that the reliability of communication with the second UE in the licensed band is less than or equal to the designated value, requesting the communication in the unlicensed band.

According to an embodiment, the unlicensed band may include 5.9 GHz band.

According to various embodiments, a second user equipment (UE) may comprise a transceiver to transmit and receive a wireless signal; and a processor connected to the transceiver, wherein the processor may be configured to transmit first side link control information (SCI) to the first UE through a physical side link control channel (PSCCH) configured in unlicensed band, transmit a second SCI to the first UE through a physical side link shared channel (PSSCH) determined based on the PSCCH, wherein the first SCI and the second SCI may be configured in different formats, and based on at least one of the first SCI and the second SCI, transmit data to the first UE through a side link communication path between the first UE and the second UE.

According to an embodiment, the processor may be further configured to transmit capability information on communication in the unlicensed band to the first UE.

According to an embodiment, the at least one of the first SCI and the second SCI may include information on channel access, information on feedback request, or information on channel occupancy.

According to an embodiment, the processor may be further configured to receive downlink control information (DCI) related to the unlicensed band, wherein the DCI includes information on channel in the unlicensed band for performing the side link communication with the first UE, and determine a channel to performing the side link communication with the first UE.

According to various embodiments, a computer readable storage medium storing one or more programs, the one or more programs may comprise instructions which cause the first electronic device to receive first side link control information (SCI) from a second UE through a physical side link control channel (PSCCH) configured in unlicensed band, receive a second SCI from the second UE through a physical side link shared channel (PSSCH) determined based on the PSCCH, wherein the first SCI and the second SCI are configured in different formats, based on at least one of the first SCI and the second SCI, identify information for performing side link communication with the second UE in the unlicensed band, and receive, based on the identified information, data from the second UE through a side link communication path between the first UE and the second UE.

The user equipment according to the above-described embodiments may include a vehicle. When the user equipment according to the above-described embodiments is a vehicle, the side link communication according to the above-described embodiments may mean V2X communication. Accordingly, a detailed configuration of a vehicle, which is a user equipment for performing the above-described embodiments, may be described in FIGS. 13 to 15.

Figure 13:
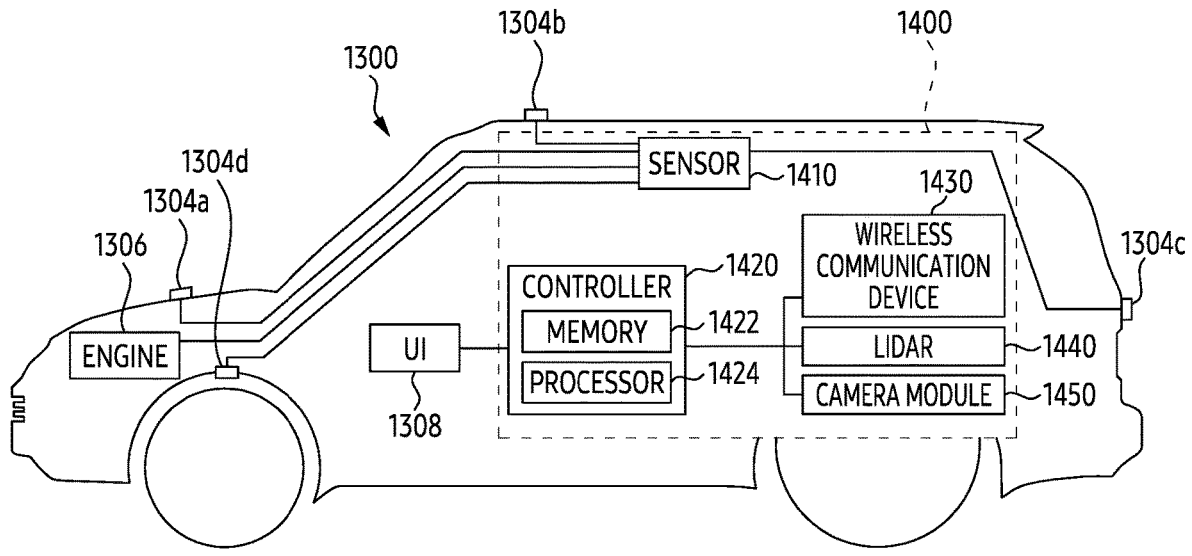
FIG. 13 illustrates an example of a user equipment according to various embodiments.

FIG. 13 illustrates an example of a user equipment according to various embodiments.

Figure 14:
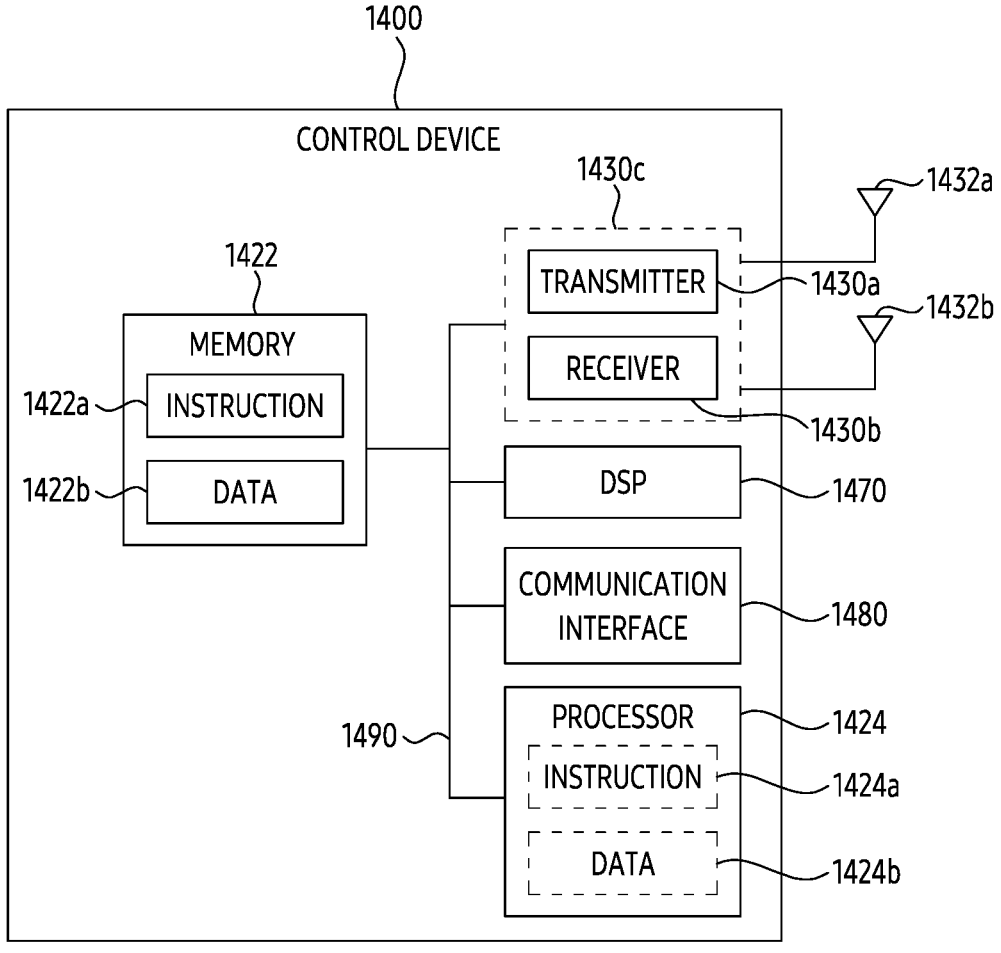
FIG. 14 illustrates an example of a functional configuration of a user equipment according to various embodiments.

FIG. 14 illustrates an example of a functional configuration of a user equipment according to various embodiments.

Figure 15:
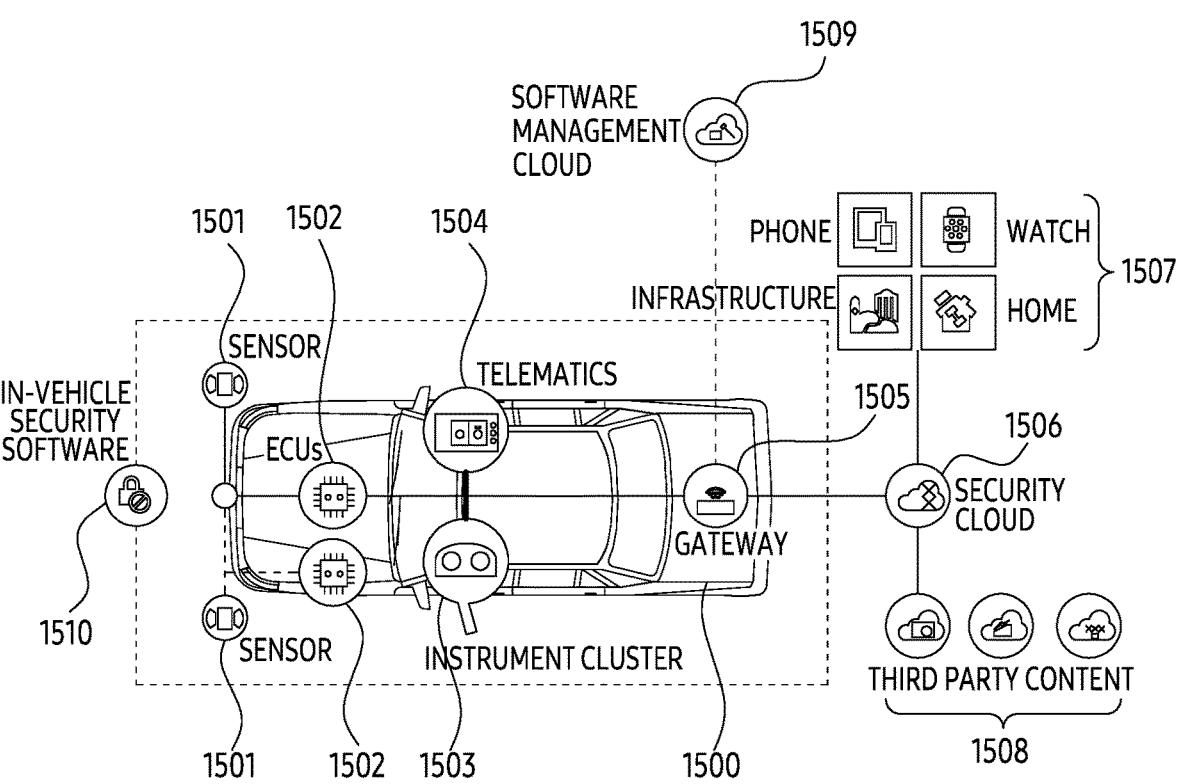
FIG. 15 illustrates an example of a gateway related to a user equipment according to various embodiments.

FIG. 15 illustrates an example of a gateway related to a user equipment according to various embodiments.

Referring to FIGS. 13 to 15, the control device 1400 according to various embodiments may be mounted on the vehicle 1300.

In various embodiments, the control device 1400 may include a controller 1420 including a memory 1422 and a processor 1424, and a sensor 1410.

According to various embodiments, the controller 1420 may be configured by a manufacturer of a vehicle or may be additionally configured to perform a function of autonomous driving after manufacturing. Alternatively, a configuration for continuously performing additional functions may be included through an upgrade of the controller 1420 configured during manufacturing.

The controller 1420 may transmit the control signal to the sensor 1410, the engine 1306, the user interface 1308, the wireless communication device 1430, the LIDAR 1440, and the camera module 1450 included in other components in the vehicle. In addition, although not shown, the controller 1420 may transmit a control signal to an acceleration device, a braking system, a steering device, or a navigation device related to driving of the vehicle.

In various embodiments, the controller 1420 may control the engine 1306, for example, detect the speed limit on the road where the autonomous vehicle 1300 is traveling, control the engine 1306 so that the driving speed does not exceed the speed limit, or control the engine 1306 to accelerate the driving speed of the autonomous vehicle 1300 within a speed limit. In addition, when sensing modules 1304a, 1304b, 1304c, and 1304d detect the environment outside the vehicle and transmit it to the sensor 1410, the controller 1420 may receive it and generate a signal for controlling the engine 1306 or the steering device (not shown) to control driving of the vehicle.

When there is another vehicle or obstruction in front of the vehicle, the controller 1420 may control the engine 1306 or the braking system to decelerate the driving vehicle and in addition to speed, control a trajectory, a driving path, and a steering angle. Alternatively, the controller 1420 may control driving of the vehicle by generating a necessary control signal according to recognition information of other external environments such as a driving lane of the vehicle and a driving signal.

By performing communication with neighboring vehicles or central servers in addition to generating their own control signals and transmitting commands for controlling peripheral devices through the received information, the controller 1420 may also control driving of the vehicle.

In addition, when the position of the camera module 1450 is changed or the angle of view is changed, accurate vehicle or lane recognition may be difficult, to prevent this, the controller 1420 may generate a control signal for controlling the camera module 1450 to perform calibration. In other words, even when the mounting position of the camera module 1450 is changed due to vibration or impact generated by the movement of the autonomous vehicle 1300, the controller 1420 may continuously maintain a normal mounting position, direction, and angle of view of the camera module 1450 by generating a calibration control signal to the camera module 1450. When the initial mounting position, direction, and angle of view information of the camera module 1450 stored in advance and the initial mounting position, direction, and angle of view information of the camera module 1450 measured while driving of the autonomous vehicle 1300 vary above a threshold value, the controller 1420 may generate a control signal to perform calibration of the camera module 1450.

According to various embodiments, the controller 1420 may comprise a memory 1422 and a processor 1424. The processor 1424 may execute the software stored in the memory 1422 according to the control signal of the controller 1420. Specifically, the controller 1420 stores data and instructions for scrambling audio data according to various embodiments in the memory 1422, and the instructions may be executed by processor 1424 to implement one or more methods disclosed herein.

In various embodiments, the memory 1422 may be stored in a recording medium executable by the processor 1424. The memory 1422 may store software and data through an appropriate internal and external device. The memory 1422 may be configured as a device connected to random access memory (RAM), read only memory (ROM), hard disk, and dongle.

The memory 1422 may store at least an operating system (OS), a user application, and executable commands. The memory 1422 may also store application data and array data structures.

The processor 1424 may be a controller, microcontroller, or state machine as a microprocessor or an appropriate electronic processor.

The processor 1424 may be implemented as a combination of computing devices, the computing device may be a digital signal processor, microprocessor, or configured in an appropriate combination thereof.

In addition, according to various embodiments, the control device 1400 may monitor internal and external features of the autonomous vehicle 1300 and detect a state thereof with at least one sensor 1410.

The sensor 1410 may be configured with at least one sensing module 1304 (e.g., sensor 1304*a*, sensor 1304*b*, sensor 1304*c*, and sensor 1304*d*), the sensing module 1304 may be implemented at a specific location of the autonomous vehicle 1300 according to the sensing purpose. For example, the sensing module 1304 may be located at a lower end, a rear end, a front end, an upper end, or a side end of the autonomous vehicle 1300, and may also be located at an internal component or tire of the vehicle.

Through this, the sensing module 1304 may detect information related to driving, such as engine 1306, tire, steering angle, speed, vehicle weight, and the like, as internal information of the vehicle. In addition, at least one sensing module 1304 may include an acceleration sensor, a gyroscope, an image sensor, a RADAR, an ultrasonic sensor, a LiDAR sensor and the like, and detect movement information of the autonomous vehicle 1300.

The sensing module 1304 may receive specific data on an external environmental state such as state information of a road on which the autonomous vehicle 1300 is located, surrounding vehicle information, weather, and the like, and may detect vehicle parameters accordingly. The detected information may be stored in the memory 1422, temporarily or in the long term, depending on the purpose.

According to various embodiments, the sensor 1410 may integrate and collect information of sensing modules 1304 for collecting information generated inside and outside the autonomous vehicle 1300.

The control device 1400 may further comprise a wireless communication device 1430.

The wireless communication device 1430 is configured to implement wireless communication between autonomous vehicles 1300. For example, the autonomous vehicle 1300 may communicate with a user's mobile phone, another wireless communication device 1430, another vehicle, a central device (traffic control device), a server, and the like. The wireless communication device 1430 may transmit and receive a wireless signal according to a connection wireless protocol. A wireless communication protocols may be Wi-Fi, Bluetooth, Long-Term Evolution (LTE), Code Division Multiple Access (CDMA), Wideband Code Division Multiple Access (WCDMA), Global Systems for Mobile Communications (GSM), and the communication protocol is not limited thereto.

In addition, according to various embodiments, in addition, according to various embodiments, the autonomous vehicle 1300 may implement communication between vehicles through the wireless communication device 1430. In other words, the wireless communication device 1430 may communicate with other vehicles and other vehicles on the road through V2V (vehicle-to-vehicle communication or V2X). The autonomous vehicle 1300 may transmit and receive information such as a driving warning and traffic information through communication between vehicles and may request information or receive requests from other vehicles. For example, the wireless communication device 1430 may perform V2V communication with a dedicated short-range communication (DSRC) device or a cellular-V2V (C-V2V) device. Besides communication between vehicles, V2X (vehicle to everything communication) between the vehicle and other objects (e.g., electronic devices carried by pedestrians) may also be implemented through the wireless communication device 1430.

In addition, the control device 1400 may comprise the LIDAR device 1440. The LIDAR device 1440 may detect an object around the autonomous vehicle 1300 during operation Using data sensed through a LIDAR sensor. The LIDAR device 1440 may transmit the detected information to the controller 1420, and the controller 1420 may operate the autonomous vehicle 1300 according to the detection information. For example, when there is a vehicle ahead moving at low speed in the detection information, the controller 1420 may command the vehicle to slow down through the engine 1306. Alternatively, the vehicle may be ordered to slow down according to the curvature of the curve into which it is entering.

The control device 1400 may further comprise a camera module 1450. The controller 1420 may extract object information from an external image photographed by the camera module 1450 and allow the controller 1420 to process information on the information.

In addition, the control device 1400 may further comprise imaging devices for recognizing an external environment. In addition to the LIDAR 1440, RADAR, GPS devices, driving distance measuring devices (Odometry), and other computer vision devices may be used, and these devices operate selectively or simultaneously as needed to enable more precise detection.

The autonomous vehicle 1300 may further comprise a user interface 1308 for user input to the control device 1400 described above. User interface 1308 may allow the user to input information with appropriate interaction. For example, it may be implemented as a touch screen, a keypad, an operation button, or the like. The user interface 1308 may transmit an input or command to the controller 1420, and the controller 1420 may perform a vehicle control operation in response to the input or command.

In addition, the user interface 1308 may perform communication with the autonomous vehicle 1300 through the wireless communication device 1430 which is a device outside the autonomous vehicle 1300. For example, the user interface 1308 may enable interworking with a mobile phone, tablet, or other computer device.

Furthermore, according to various embodiments, although the autonomous vehicle 1300 is described as including the engine 1306, may also comprise other types of propulsion systems. For example, the vehicle may be operated with electrical energy and may be operated through hydrogen energy, or a hybrid system combined with the same. Accordingly, the controller 1420 may include a propulsion mechanism according to a propulsion system of the autonomous vehicle 1300 and provide a control signal accordingly to the components of each propulsion mechanism.

Hereinafter, a detailed configuration of the control device 1400 for scrambling audio data according to various embodiments will be described in more detail with reference to FIG. 14.

The control device 1400 includes a processor 1424. The processor 1424 may be a general purpose single or multi-chip microprocessor, a dedicated microprocessor, a microcontroller, a programmable gate array, or the like. The processor may be referred to as a central processing unit (CPU). In addition, according to various embodiments, the processor 1424 may be used as a combination of a plurality of processors.

The control device 1400 also comprises a memory 1422. The memory 1422 may be any electronic component capable of storing electronic information. The memory 1422 may also include a combination of memories 1422 in addition to a single memory.

According to various embodiments, data and instructions 1422*a* for scrambling audio data may be stored in the memory 1422. When the processor 1424 executes the instructions 1422*a*, the instructions 1422*a* and all or part of the data 1422*b* required for executing the instructions may be loaded onto the processor 1424 (e.g., the instructions 1424*a*, the data 1424*b*).

The control device 1400 may include a transmitter 1430*a*, a receiver 1430*b*, or a transceiver 1430*c* for allowing transmission and reception of signals. One or more antennas 1432*a* and 1432*b* may be electrically connected to a transmitter 1430*a*, a receiver 1430*b*, or each transceiver 1430*c*, and may additionally comprise antennas.

The control device 1400 may comprise a digital signal processor DSP 1470. The DSP 1470 may enable the vehicle to quickly process the digital signal.

The control device 1400 may comprise a communication interface 1480. The communication interface 1480 may comprise one or more ports and/or communication modules for connecting other devices to the control device 1400. The communication interface 1480 may allow the user and the control device 1400 to interact.

Various configurations of the control device 1400 may be connected together by one or more buses 1490, the buses 1490 may comprise a power bus, a control signal bus, a state signal bus, a data bus, and the like. Under the control of the processor 1424, the configurations may transmit mutual information and perform a desired function through the bus 1490.

Meanwhile, in various embodiments, the control device 1400 may be related to a gateway for communication with the secure cloud. For example, referring to FIG. 15, the control device 1400 may be related to the gateway 1505 for providing information obtained from at least one of the components 1501 to 1504 of the vehicle 1500 to the secure cloud 1506. For example, the gateway 1505 may be comprised in the control device 1400. For another example, gateway 1505 may be configured as a separate device in vehicle 1500 distinguished from control device 1400. Gateway 1505 connects software management cloud 1509 having different networks, secure cloud 1506 and network in secured vehicle 1500 by in-vehicle security software 1510 to be enable communication.

For example, component 1501 may be a sensor. For example, the sensor may be used to obtain information on at least one of a state of the vehicle 1500 or a state around the vehicle 1500. For example, component 1501 may comprise a sensor 1410.

For example, component 1502 may be electronic control units (ECUs). For example, the ECUs may be used for engine control, transmission control, airbag control, and tire pressure management.

For example, component 1503 may be an instrument cluster. For example, the instrument cluster may refer to a panel positioned in front of a driver's seat among dashboards. For example, the instrument cluster may be configured to show information necessary for driving to a driver (or passenger). For example, the instrument cluster may be used to display at least one of Visual elements for indicating revolution per minute (RPM), the speed of the vehicle 1500, the amount of residual fuel, gear conditions and information obtained through component 1501.

For example, component 1504 may be a telematics device. For example, the telematics device may refer to a device that provides various mobile communication services such as location information and safe driving in a vehicle 1500 by combining wireless communication technology and global positioning system (GPS) technology. For example, the telematics device may be used to connect the driver, the cloud (e.g., secure cloud 1506), and/or the surrounding environment to the vehicle 1500. For example, the telematics device may be configured to support high bandwidth and low latency for technology of 5G NR standard (e.g., V2X technology of 5G NR). For example, the telematics device may be configured to support autonomous driving of the vehicle 1500.

For example, gateway 1505 may be used to connect a network in the vehicle 1500 to a software management cloud 1509, which are out-of-vehicle networks and a secure cloud 1506. For example, the software management cloud 1509 may be used to update or manage at least one software required for driving and managing the vehicle 1500. For example, the software management cloud 1509 may be linked with in-car security software 1510 installed in the vehicle. For example, in-vehicle security software 1510 may be used to provide a security function in the vehicle 1500. For example, the in-vehicle security software 1510 may encrypt data transmitted and received through the in-vehicle network using an encryption key obtained from an external authorized server for encryption of the in-vehicle network. In various embodiments, the encryption key used by in-vehicle security software 1510 may be generated corresponding to vehicle identification information (vehicle license plate, or information uniquely assigned to each user (e.g., user identification information, vehicle identification number).

In various embodiments, gateway 1505 may transmit data encrypted by in-vehicle security software 1510 to software management cloud 1509 and/or secure cloud 1506 based on the encryption key. Software management cloud 1509 and/or secure cloud 1506 may identify that data was received from which vehicle or from which user, by decrypting the data encrypted by the encryption key of the security software 1510 in the vehicle using a decryption key capable of decrypting the data. For example, since the decryption key is a unique key corresponding to the encryption key, the software management cloud 1509 and/or the secure cloud 1506 may identify a sender (e.g., a vehicle or a user) of data based on the decryption key.

For example, gateway 1505 may be configured to support in-vehicle security software 1510 and may be related to control device 1400. For example, gateway 1505 may be related to control device 1400 to support a connection between client device 1507 connected to secure cloud 1506 and control device 1400. For another example, gateway 1505 may be related to control device 1400 to support a connection between third-party cloud 1508 connected to secure cloud 1506 and control device 1400. However, it is not limited thereto.

In various embodiments, the gateway 1505 may be used to connect the vehicle 1500 with the software management cloud 1509 for managing the operating software of the vehicle 1500. For example, the software management cloud 1509 may monitor whether update of the operating software of the vehicle 1500 is required and provide data for updating the operating software of the vehicle 1500 through the gateway 1505 based on monitoring the request for updating the operating software of the vehicle 1500. For another example, the software management cloud 1509 may receive a user request for updating the operating software of the vehicle 1500 from the vehicle 1500 through the gateway 1505 and provide data for updating the operating software of the vehicle 1500 based on the reception. However, it is not limited thereto.

The device described above may be implemented as a hardware component, a software component, and/or a combination of hardware components and software components.

For example, the devices and components described in the embodiments may be implemented using one or more general purpose computers or special purpose computers such as processor, controller, ALU (arithmetic logic unit), digital signal processor, microcomputer, FPGA (field programmable gate array), PLU (programmable logic unit), microprocessor or any other device capable of executing and responding to instructions. The processing device may perform an operating system (OS) and one or more software applications performed on the operating system. In addition, the processing device may access, store, manipulate, process, and generate data in response to execution of the software. For convenience of understanding, although it may be described that one processing device is used, a person skilled in the art may see that the processing device may include a plurality of processing elements and/or a plurality of types of processing elements. For example, the processing device may include a plurality of processors or one processor and one controller. In addition, other processing configurations such as parallel processors are possible.

The software may comprise a computer program, code, instruction, or a combination of one or more of these, configure the processing device to operate as desired, or command the processing device independently or collectively. Software and/or data may be embodied in any type of machine, component, physical device, computer storage medium, or device to be interpreted by a processing device or to provide instructions or data to a processing device. The software may be distributed on networked computer systems and stored or executed in a distributed manner. Software and data may be stored in one or more computer-readable recording media.

The method according to the embodiment may be implemented in the form of a program command that may be performed through various computer means and recorded on a computer-readable medium. In this case, the medium may continue to store a computer-executable program, or may temporarily store the program for execution or download. In addition, the medium may be various recording or storage means in which a single or several hardware is combined, and may not be limited to a medium directly connected to a computer system, but may be distributed over a network. Examples of media comprise magnetic media such as hard disks, floppy disks, and magnetic tape, optical recording media such as CD-ROM and DVD, magneto-optical medium, such as a floptical disk, anything configured to store program instructions, including ROM, RAM, flash memory, etc. In addition, examples of other media include app stores that distribute applications, sites that supply or distribute other various software, and recording media or storage media managed by servers.

Although embodiments have been described according to limited embodiments and drawings as above, various modifications and modifications are possible from the above description to those of ordinary skill in the art. For example, appropriate results may be achieved if the described techniques are performed in a different order from the described methods, and/or components such as systems, structures, devices, and circuits are combined or combined in a different form from the described methods.

Thus, other implementations, other embodiments, and those equivalent to the claims also fall within the scope of the claims to be described later.

What is claimed is:

1. A first user equipment (UE) comprising:
a transceiver to transmit and receive a wireless signal; and
a processor connected to the transceiver, wherein the processor is configured to:
receive, from a base station, a radio resource control (RRC) message including a parameter indicating that information on a channel occupancy time (COT) duration is allowed to be transmitted by a physical sidelink control channel (PSCCH);
receive first sidelink control information (SCI) from a second UE through a physical sidelink control channel (PSCCH) configured in shared spectrum, wherein the first SCI includes 1-bit indicator associated with channel access, and
wherein the 1-bit indicator is included in the first SCI in case that the parameter, indicating that information on the COT duration is allowed to be transmitted by the PSCCH, is received through the RRC message;
receive a second SCI used for sidelink scheduling from the second UE through a physical sidelink shared channel (PSSCH) determined based on the first SCI, wherein the first SCI and the second SCI are configured in different formats, and wherein the second SCI includes information on the COT duration for the second UE;
based on the second SCI, identify the information on the COT duration for the second UE in the shared spectrum; and
perform, based on the information on the COT duration for the second UE, a sidelink communication with the second UE in the shared spectrum.

2. The first UE according to claim 1, wherein the at least one of the first SCI and the second SCI includes information on channel access, or information on feedback request.

3. The first UE according to claim 2, wherein size of the information on channel access is set based on another parameter being configured by the RRC signaling.

4. The first UE according to claim 2, wherein the information on feedback request is to set a first value for indicating that feedback is requested or a second value for indicating that the feedback is not requested.

5. The first UE according to claim 1, wherein the processor is further configured to:
receive downlink control information (DCI) related to the shared spectrum, wherein the DCI includes information on channel in the shared spectrum for performing the sidelink communication with the second UE; and
determine a channel for performing the sidelink communication with the second UE.

6. The first UE according to claim 1, wherein the processor is further configured to transmit capability information on the sidelink communication in the shared spectrum to the second UE.

7. The first UE according to claim 6, wherein the processor is further configured to:
identify that reliability of communication with the second UE in licensed band is less than or equal to a designated value while performing the sidelink communication with the second UE; and
based on identifying that the reliability of communication with the second UE in the licensed band is less than or equal to the designated value, request the communication in the shared spectrum.

8. The first UE according to claim 1, wherein the 1-bit indicator is not included in the first SCI in case that the parameter, indicating that information on the COT duration is allowed to be transmitted by the PSCCH, is not received through the RRC message.

9. A method for operating a first user equipment (UE) comprising:

receiving, from a base station, a radio resource control (RRC) message including a parameter indicating that information on a channel occupancy time (COT) duration is allowed to be transmitted by a physical sidelink control channel (PSCCH);

receiving first sidelink control information (SCI) from a second UE through a physical sidelink control channel (PSCCH) configured in shared spectrum, wherein the first SCI includes 1-bit indicator associated with channel access, and wherein the 1-bit indicator is included in the first SCI in case that the parameter, indicating that information on the COT duration is allowed to be transmitted by the PSCCH, is received through the RRC message;

receiving a second SCI used for sidelink scheduling from the second UE through a physical sidelink shared channel (PSSCH) determined based on the first SCI, wherein the first SCI and the second SCI are configured in different formats, and wherein the second SCI includes information on the COT duration for the second UE;

based on the second SCI, identifying the information on the COT duration for the second UE in the shared spectrum; and performing, based on the information on the COT duration for the second UE, a sidelink communication with the second UE in the shared spectrum.

10. The method according to claim 9, wherein the at least one of the first SCI and the second SCI includes information on channel access, or information on feedback request.

11. The method according to claim 10, wherein size of the information on channel access is set based on another parameter being configured by the RRC signaling.

12. The method according to claim 10, wherein the information on feedback request is set to a first value for indicating that feedback is requested or a second value for indicating that the feedback is not requested.

13. The method according to claim 9, further comprising:

receiving downlink control information (DCI) related to the shared spectrum, wherein the DCI includes information on channel in the shared spectrum for performing the sidelink communication; and determining a channel for performing the sidelink communication with the second UE.

14. The method according to claim 9, further comprising:

transmitting capability information on the sidelink communication in the shared spectrum.

15. The method according to claim 14, further comprising:

identifying that reliability of communication with the second UE in licensed band is less than or equal to a designated value while performing the sidelink communication with the second UE; and based on identifying that the reliability of communication with the second UE in the licensed band is less than or equal to the designated value, requesting the communication in the shared spectrum.

16. The method according to claim 9, wherein the 1-bit indicator is not included in the first SCI in case that the parameter, indicating that information on the COT duration is allowed to be transmitted by the PSCCH, is not received through the RRC message.

17. A second user equipment (UE) comprising:

a transceiver to transmit and receive a wireless signal; and a processor connected to the transceiver, wherein the processor is configured to:

receive, from a base station, a radio resource control (RRC) message including a parameter indicating that information on a channel occupancy time (COT) duration is allowed to be transmitted by a physical sidelink control channel (PSCCH);

transmit first sidelink control information (SCI) to the first UE through a physical sidelink control channel (PSCCH) configured in shared spectrum, wherein the first SCI includes 1-bit indicator associated with channel access, and wherein the 1-bit indicator is included in the first SCI in case that the parameter, indicating that information on the COT duration is allowed to be transmitted by a PSCCH, is received through the RRC message;

transmit a second SCI used for sidelink scheduling to the first UE through a physical sidelink shared channel (PSSCH) determined based on the first SCI, wherein the first SCI and the second SCI are configured in different formats, and wherein the second SCI includes information on the COT duration for the second UE; and perform, based on the information on the COT duration for the second UE, a sidelink communication with the first UE in the shared spectrum.

18. The second UE according to claim 17, wherein the processor is further configured to transmit capability information on communication in the shared spectrum to the first UE.

19. The second UE according to claim 17, wherein the at least one of the first SCI and the second SCI includes information on channel access, or information on feedback request.

20. The second UE according to claim 19, wherein the processor is further configured to:

receive downlink control information (DCI) related to the shared spectrum, wherein the DCI includes information on channel in the shared spectrum for performing the sidelink communication with the first UE; and determine a channel for performing the sidelink communication with the first UE.

* * * * *